US008972872B2

(12) United States Patent
Labrou et al.

(10) Patent No.: US 8,972,872 B2
(45) Date of Patent: Mar. 3, 2015

(54) BUILDING COMPUTING APPLICATIONS BASED UPON METADATA

(75) Inventors: Yannis Labrou, Washington, DC (US); Ryusuke Masuoka, Potomac, MD (US); Zhexuan Song, Silver Spring, MD (US); Guang Huang, Ellicott City, MD (US)

(73) Assignee: Fujitsu Limited, Kawasaki (JP)

( * ) Notice: Subject to any disclaimer, the term of this patent is extended or adjusted under 35 U.S.C. 154(b) by 1402 days.

(21) Appl. No.: 11/691,807

(22) Filed: Mar. 27, 2007

(65) Prior Publication Data

US 2007/0266384 A1    Nov. 15, 2007

Related U.S. Application Data

(60) Provisional application No. 60/785,973, filed on Mar. 27, 2006.

(51) Int. Cl.
*G06F 3/048* (2013.01)
*G06F 9/44* (2006.01)

(52) U.S. Cl.
CPC ........................................ *G06F 8/00* (2013.01)
USPC ........... 715/762; 715/744; 715/763; 717/105; 717/111

(58) Field of Classification Search
CPC ....... G06F 3/048; G06F 3/04817; G06F 8/34; G06F 8/36; G06F 8/38; H04L 67/16
USPC ................... 715/744, 762–763; 717/105, 111
See application file for complete search history.

(56) References Cited

U.S. PATENT DOCUMENTS

| 5,224,205 | A | | 6/1993 | Dinkin et al. |
| 5,530,861 | A | | 6/1996 | Diamant et al. |
| 5,815,811 | A | | 9/1998 | Pinard et al. |
| 5,920,868 | A | * | 7/1999 | Fowlow et al. ........................ 1/1 |
| 5,968,116 | A | | 10/1999 | Day, II et al. |
| 5,979,757 | A | | 11/1999 | Tracy et al. |
| 5,991,535 | A | * | 11/1999 | Fowlow et al. ............... 717/107 |
| 6,002,918 | A | | 12/1999 | Heiman et al. |
| 6,067,297 | A | | 5/2000 | Beach |

(Continued)

FOREIGN PATENT DOCUMENTS

JP    2004-318809    11/2004

OTHER PUBLICATIONS

U.S. Appl. No. 11/512,405, filed Aug. 30, 2006, Ryusuke Masuouka, et al., Fujitsu Limited.

(Continued)

*Primary Examiner* — Amy Ng
*Assistant Examiner* — Sajeda Muhebbullah
(74) *Attorney, Agent, or Firm* — Staas & Halsey LLP

(57) ABSTRACT

Associating a semantic service description (SSD) with a service, wherein the SSD comprises a semantic description of the service, including a semantic description of a parameter of the service, according to a computer interpretable language, and, as a service grounding, a mapping between the computer interpretable language expressing the SSD and an interface, including an interface parameter, of the service. A dynamic composition of a task based upon a user selection of a plurality of known services is supported and a dynamic association of the task with a user interface of an application is supported, based upon associating the task with the user selection of a UI object, a UI display screen, and a UI event for the application.

14 Claims, 17 Drawing Sheets

(56) References Cited

U.S. PATENT DOCUMENTS

| | | | |
|---|---|---|---|
| 6,084,528 | A | 7/2000 | Beach et al. |
| 6,101,528 | A | 8/2000 | Butt |
| 6,173,316 | B1 | 1/2001 | De Boor et al. |
| 6,178,426 | B1 | 1/2001 | Klein et al. |
| 6,188,681 | B1 | 2/2001 | Vesuna |
| 6,199,753 | B1 | 3/2001 | Tracy et al. |
| 6,216,158 | B1 | 4/2001 | Luo et al. |
| 6,286,047 | B1 | 9/2001 | Ramanathan et al. |
| 6,324,567 | B2 | 11/2001 | Chidambaran et al. |
| 6,430,395 | B2 | 8/2002 | Arazi et al. |
| 6,446,096 | B1 | 9/2002 | Holland et al. |
| 6,456,892 | B1 | 9/2002 | Dara-Abrams et al. |
| 6,466,971 | B1 | 10/2002 | Humpleman et al. |
| 6,502,000 | B1 | 12/2002 | Arnold et al. |
| 6,509,913 | B2 | 1/2003 | Martin, Jr. et al. |
| 6,556,875 | B1* | 4/2003 | Nagasaka et al. .............. 700/19 |
| 6,560,640 | B2 | 5/2003 | Smethers |
| 6,757,902 | B2* | 6/2004 | Katz et al. ..................... 719/318 |
| 6,792,605 | B1 | 9/2004 | Roberts et al. |
| 6,859,803 | B2* | 2/2005 | Dagtas et al. ......................... 1/1 |
| 6,901,596 | B1 | 5/2005 | Galloway |
| 6,910,037 | B2* | 6/2005 | Gutta et al. ........................... 1/1 |
| 6,947,404 | B1 | 9/2005 | Zalka |
| 6,956,833 | B1 | 10/2005 | Yukie et al. |
| 6,983,227 | B1 | 1/2006 | Thalhammer-Reyero |
| 7,065,058 | B1 | 6/2006 | Korus |
| 7,079,518 | B2 | 7/2006 | Park et al. |
| 7,170,857 | B2 | 1/2007 | Stephens |
| 7,376,571 | B1* | 5/2008 | Racine et al. .................. 705/1.1 |
| 7,406,660 | B1 | 7/2008 | Sikchi et al. |
| 7,424,701 | B2 | 9/2008 | Kendall et al. |
| 7,548,847 | B2 | 6/2009 | Acero et al. |
| 7,577,910 | B1 | 8/2009 | Husemann |
| 7,596,754 | B2* | 9/2009 | Wessling et al. .............. 715/705 |
| 7,610,045 | B2 | 10/2009 | Little |
| 7,747,958 | B2* | 6/2010 | Luo et al. ...................... 715/762 |
| 2002/0078255 | A1 | 6/2002 | Narayan |
| 2002/0107939 | A1 | 8/2002 | Ford et al. |
| 2002/0116225 | A1 | 8/2002 | Morse et al. |
| 2003/0036917 | A1 | 2/2003 | Hite et al. |
| 2003/0204645 | A1 | 10/2003 | Sharma et al. |
| 2004/0054690 | A1* | 3/2004 | Hillerbrand et al. ........ 707/104.1 |
| 2004/0083205 | A1* | 4/2004 | Yeager ............................... 707/3 |
| 2004/0204063 | A1 | 10/2004 | Van Erlach |
| 2004/0207659 | A1* | 10/2004 | Goodman et al. ............ 345/762 |
| 2004/0230636 | A1 | 11/2004 | Masuoka et al. |
| 2005/0021560 | A1 | 1/2005 | Yoon et al. |
| 2005/0060372 | A1 | 3/2005 | DeBettencourt |
| 2005/0080768 | A1 | 4/2005 | Zhang |
| 2005/0160362 | A1 | 7/2005 | Obradovic et al. |
| 2006/0195411 | A1* | 8/2006 | Knight et al. ................... 706/45 |
| 2006/0271537 | A1* | 11/2006 | Chandrasekharan et al. .... 707/7 |
| 2007/0157096 | A1* | 7/2007 | Keren et al. ................... 715/760 |

OTHER PUBLICATIONS

U.S. Appl. No. 10/733,328, filed Dec. 12, 2003, Ryusuke Masuoka et al., Fujitsu Limited.

U.S. Appl. No. 11/115,403, filed Apr. 27, 2005, Yannis Labrou, Fujitsu Limited.

U.S. Appl. No. 11/014,904, filed Dec. 20, 2004, Patrick Armstrong et al, Fujitsu Limited.

U.S. Notice of Allowance mailed Feb. 23, 2010 in related co-pending U.S. Appl. No. 11/115,403.

U.S. Supplemental Notice of Allowance mailed Apr. 8, 2010 in related co-pending U.S. Appl. No. 11/115,403.

U.S. Office Action mailed Jan. 26, 2010 in related co-pending U.S. Appl. No. 11/512,405.

U.S. Office Action mailed May 24, 2010 in related co-pending U.S. Appl. No. 11/014,904.

U.S. Office Action mailed Jul. 22, 2010 in related co-pending U.S. Appl. No. 11/512,405.

U.S. Office Action mailed Sep. 13, 2010 in related co-pending U.S. Appl. No. 10/733,328.

Ankolekar, Anupriya, et al., "DAML-S: Web Service Description for the Semantic Web", The Semantic Web—ISWC 2002. First International Web Conference Proceedings (Lecture Notes in Computer Science vol. 2342), The Semantic Web—ISWC 2002; XP-002276131; Sardinia, Italy; Jun. 2002; (pp. 348-363).

Bader, Gary D., et al., BioPAX—Biological Pathways Exchange Language, Level 1, Version 1.0 Documentation; © 2004 BioPAX Workgroup, BioPAX Recommendation [online] Jul. 7, 2004; Retrieved from the Internet: <URL: http://www.biopax.org/release/biopax-level1.owl>.

De Roure, David, et al., "E-Science", Guest Editors' Introduction, IEEE Intelligent Systems; Published by the IEEE Computer Society, © Jan./Feb. 2004 IEEE, pp. 24-63.

"Gene Ontology Consortium" OBO—Open Biological Ontologies; [online] [Retrieved on Oct. 22, 2004] Retrieved from the Internet <URL: http://www.geneontology.org/> (6 pages).

Handschuh S., et al. "Annotation for the deep web", IEEE Intelligent Systems, IEEE Service Center, New York, NY, US, vol. 18, No. 5, Sep. 1, 2003; pp. 42-48; XP011101996 ISSN: 1094-7167—Abstract (1 page).

Zhexuan Song, et al. "Dynamic Service Discovery and Management in Task Computing," pp. 310-318, MobiQuitous 2003, Aug. 22-26, 2004, Boston, pp. 1-9.

MaizeGDB, "Welcome to MaizeGDB!", Maize Genetics and Genomics Database; [online] [Retrieved on Oct. 22, 2004] Retrieved from the Internet <http://www.maizegdb.com/>.

Marenco et al., "QIS: A framework for biomedical database federation" Journal of the American Medical Informatics Association, Hanley and Belfus, Philadelphia, PA, US, vol. 11, No. 6, Nov. 1, 2004; pp. 523-524, XP005638526; ISSN: 1067-5027.

Ramey, Chet; "Bash Reference Manual", Version 2.02, Apr. 1, 1998; XP-002276132; pp. i-iv; p. 1; and pp. 79-96.

Trellis, "Capturing and Exploiting Semantic Relationships for Information and Knowledge Management", The Trellis Project at Information Sciences Institute (ISI), [online] [Retrieved on Oct. 22, 2004] Retrieved from the Internet <URL: http://www.isi.edu/ikcap/trellis/> 2 pages.

Information Sciences Institute; USC Viterbi School of Engineering; [online] [Retrieved on Oct. 22, 2004] Retrieved from the Internet <URL: http://www.isi.edu/> 2 pages.

Mindswap—Maryland Information and Network Dynamics Lab Semantic Web Agents Project; SWOOP—Hypermedia-based OWL Ontology Browser and Editor; [online] [Retrieved on Oct. 22, 2004] Retrieved from the Internet <URL: http://www.mindswap.org/2004/SWOOP> (3 pages).

Mindswap—Maryland Information and Network Dynamics Lab Semantic Web Agents Project; OntoLink; Semantic Web Research Group; [online] [Retrieved on Oct. 22, 2004] Retrieved from the Internet <URL: http://www.mindswap.org/2004/OntoLink> (2 pages).

Mindswap—Maryland Information and Network Dynamics Lab Semantic Web Agents Project; Pellet OWL Reasoner; [online] [Retrieved on Oct. 22, 2004] Retrieved from the Internet <URL: http://www.mindswap.org/2003/pellet/index.shtml> (3 pages).

Haarslev, Volker, "Racer", RACER System Description; News: New Racer Query Language Available; [online] [Retrieved on Oct. 22, 2004] Retrieved from the Internet <URL: http://www.cs.concordia.ca/~haarslev/racer> (10 pages).

Jambalaya, the CHISEL group; CH/SEL—Computer Human Interaction & Software Engineering Lab, Home; [online] [Retrieved on Oct. 22, 2004] Retrieved from the Internet <URL: http://www.thechiselgroup.org/jambalaya> (1 page).

Malik, Ayesha, "XML, Ontologies, and the Semantic Web", XML Journal, Openlink Virtuoso; [online] [Retrieved on Oct. 22, 2004] Retrieved from the Internet <URL: http:///www.sys-con.com/xml1/article.cfm?id=577> (7 pages).

Altschul, SF, et al., "Basic local alignment search tool", National Center for Biotechnology information, National Library of Medicine, National Institutes of Health, Bethesda, Maryland 20894; [online] [Retrieved on Oct. 22, 2004] Retrieved from the Internet <URL: http://www.ncbi.nlm.nih.gov/entrez/query.fcgi?cmd=Retrieve&db=> (3 pages).

(56) References Cited

OTHER PUBLICATIONS

NCBI BLAST *Information*; [online] [Retrieved on Oct. 22, 2004] Retrieved from the Internet <URL: http://www.ncbi.nih.gov/Education/BLASTinfo/information3.html> (1 page).
Example of Terrorism Ontology; [online] [Retrieved on Dec. 16, 2004] Retrieved from the Internet <URL http://www.mindswap.org/2003/owl/swint/terrorism> (7 pages).
Guttman, E., et al., "Service Location Protocol, Version 2", Network Working Group; @ Home Network; Vinca Corporation; Jun. 1999 (pp. 1-55).
Masuoka, Ryusuke, et al., "Task Computing—The Semantic Web meets Pervasive Computing—" Fujitsu Laboratories of America, Inc., [online] vol. 2870, 2003, pp. 866-881, <URL: http://www.mindswap.org> XP-002486064.
Rysuke Masuoka, et al. "Semantic Web and Ubiquitous Computing-Task Computing as an Example-" *AIS SIGSEMIS* Bullentin, vol. 1 No. 3, Oct. 2004, pp. 21-24.
Rysuke Masuoka, et al. "Ontology-Enabled Pervasive Computing Applications," *IEEE Intelligent Systems*, vol. 18, No. 5, Sep./Oct. 2003 (Sep. 1, 2003), pp. 68-72.
Rysuke Masuoka, et al. Task Computing—Semantic-web enabled, user driven, interactive environments, WWW Based Communities for Knowledge Presentation, Sharing, Mining and Protection (The PSMP workshop) within CIC 2003, Jun. 23-26, 2003, pp. 1.
Rysuke Masuoka, et al. "Task Computing—Filling the Gap Between Tasks and Services," Fujitsu, vol. 55;No. 4; pp. 376-383 (2004) (In Japanese) (English Abstract) (1 page).
Masuoka Ryusuke, DAML Program and the Semantic Web : Toward a More Ontological World, Journal of Japanese Society for Artificial Intelligence, Japan Jul. 2002 17(4) pp. 392-399 (pp. 397-398 "6. The future of DAML").
Goble, C., et al., Semantic Web and Grid Computing, [online], Sep. 5, 2002, pp. 1-23, [H20.8.27. search], Internet<URL: http://www.semanticgrid.org/documents/swgc/swgc-final.pdf (pp. 16-17 "8.1 MyGrid (www.mygrid.org.uk)" and Figure 5).
Preece, A., et al., Intelligent Web Services, Intelligent Systems, IEEE, Jan. 2002, vol. 17, Issue 1, pp. 15-17 (p. 16, col. right and p. 17, col. left).
1. The Semantic Grid, [online], Oct. 2002, [H21.1.5. search] , Internet<URL: http://web.archive.org/web/20021011030835/http://www.semanticgrid.org/documents/>.
The Semantic Web—ISWC 2002, First International Semantic Web Conference, Sardinia, Italy, Jun. 9-12, 2002, Proceedings, Springer, Jun. 9, 2002, [H21.1.6. search], Internet<URL: http://www.springer.com/computer/database+management+cY026+information+retrieval/book/978-3-540-43760-4?detailsPage=toc>.
European Search Report Communication issued May 7, 2004 in related Europeans Application No. 03257974.0-1243 (4 pages).
European Patent Office Communication issued Sep. 5, 2005 in related European Application No. 03257974.0-1243 (12 pages).
European Patent Office Communication issued Jan. 22, 2007 in related European Application No. 03257974.0-1243.
First Notification of Office Action issued by the State Intellectual Property Office of China on Jul. 27, 2007 in related China Application No. 200310123963.2, including the Text of the First Office Action (28 pages).
First Notification of Office Action (PCT Application Entry Into the National Phase) issued by the State Intellectual Property Office of China on Dec. 7, 2007, in the related Chinese Patent Application No. 200580013453.7 (22 pages).
Second Notification of Office Action issued by the State Intellectual Property Office of China on Jan. 4, 2008, in related Chinese Patent Application No. 200310123963.2 (2 pages).
First Notification of Office Action issued by the State Intellectual Property Office of China on Mar. 14, 2008 in corresponding Chinese Patent Application No. 200510132687.5 (9 pages).
Second Notification of Office Action issued by the State Intellectual Property Office of China on Sep. 5, 2008 in corresponding Chinese Patent Application No. 200510132687.5, including the Text of the Second Office Action (8 pages).
Third Notification of Office Action issued by the State Intellectual Property Office of China on May 9, 2008 in related China Application No. 200310123963.2, including the Text of the Third Office Action (8 pages).
Rejection Decision issued by the State Intellectual Property Office of China on Sep. 5, 2008 in related China Application No. 200310123963.2, including the Text of the Decision for Rejection (8 pages).
Extended European Search Report Communication issued Aug. 11, 2008 in corresponding European Application No. 05027181.6-1527/1672537.
Notice of Completion of Formalities for Patent Registration with the Notice of Decision of Granting Patent Right for Invention, dated Oct. 10, 2008, issued in related China Application No. 200580013453.7.
Notification of Transmittal of the International Search Report and the Written Opinion of the International Searching Authority, or the Declaration issued Jun. 27, 2006 in related International Application No. PCT/US05/14557.
Notification Concerning Transmittal of Copy of International Preliminary Report on Patentability (Chapter I of the Patent Cooperation Treaty) mailed Nov. 9, 2006 in related international Application No. PCT/US2005/014557.
Supplementary European Search Report issued by the EPC on Jul. 18, 2008 in related European Application No. 05739051.0-1243.
Notice Requesting Submission of Opinion filed Nov. 15, 2007 in related Korean Application No. 10-2006-7017143.
U.S. Office Action mailed Jun. 9, 2009 in co-pending related U.S. Appl. No. 11/115,403 (4 pages).
U.S. Office Action mailed Oct. 27, 2009 in co-pending related U.S. Appl. No. 11/115,403 (27 pages).
U.S. Office Action mailed Oct. 13, 2009 in co-pending related U.S. Appl. No. 11/014,904 (6 pages).
Japan Office Action mailed on Sep. 9, 2008 and issued in related Japanese Patent Application 2003-422759 (4 pages).
Japanese Office Action mailed on Jan. 13, 2009 and issued in related Japanese Patent Application 2003-422759 (2 pages).
U.S. Office Action mailed Nov. 4, 2010 in co-pending U.S. Appl. No. 11/014,904.
U.S. Office Action mailed Oct. 17, 2008 in co-pending U.S. Appl. No. 10/733,328.
U.S. Office Action mailed Jul. 21, 2009 in co-pending U.S. Appl. No. 10/733,328.
U.S. Office Action mailed Sep. 13, 2010 in co-pending U.S. Appl. No. 10/733,328.
Ryusuke Masuoka, et al., "Policy-based Access Control Task Computing Using Rei", WWW 2005, May 10-14, 2005, Chiba, Japan.
Yannis Labrou, et al. "Task Computing: Sematics-Oriented Middleware for Ubiquitous Computing", WWW 2005, May 10-14, 2005 Chiba, Japan.
Tallis, M., et al., The Briefing Associate: Easing Authors into the Semantic Web, Intelligent Systems, IEEE, IEEE, 2002 1 vol. 17, Issue 1, pp. 26-32.
Summons to Attend Oral Proceedings pursuant to Rule 115(1)EPC mailed Dec. 15, 2010 in related European Application No. 03257974.0-1243/1431875.
U.S. Notice of Allowance mailed Feb. 16, 2011 in co-pending U.S. Appl. No. 11/014,904.
Tadashige Iwao and Ryusuke Masuoka, "Service Compositions and Access Control for Ubiquitous Computing Environments," vol. 49, No. 4, pp. 217-224, Journal of the Operations Research Society of Japan, 2004 (4 pages of Partial English Translation (p. 217, line 1-line 7/p. 219, left line 23-right line 16/p. 220, left line 2-p. 221 left line 21).
Japanese Office Action issued Aug. 18, 2011 in related Japanese Patent Application No. 2006-244780 (3 pages) (2 pages of English Translated Office Action (p. 1, line 12-line 16/p. 2, line 21-line 31/p. 3, line 1-line 13) of Office Action from JP Application No. 2006-244780).

(56) References Cited

OTHER PUBLICATIONS

Japanese Office Action issued on Mar. 8, 2011 in related Japanese Patent Application No. 2005-365377 (3 pages) (4 pages English Translation).

Yukinori Morita, et al., "Tool of semantic Web", Information Processing, Japan, Information Processing Society Japan, Jul. 15, 2002, vol. 43, No. 7, pp. 734-741 (10 pages) (2 pages English Translation).

U.S. Supplemental Notice of Allowance issued Jun. 2, 2011 in related U.S. Appl. No. 11/014,904.

Office Action issued Aug. 9, 2011 in related co-pending U.S. Appl. No. 10/733,328.

Notice of Allowance issued Jul. 13, 2011 in related co-pending U.S. Appl. No. 11/014,904.

Notice of Allowance issued Sep. 28, 2011 in related co-pending U.S. Appl. No. 11/512,405.

Tadashige Iwao and Ryusuke Masuoka, "Service Compositions and Access Control for Ubiquitous Computing Environments," vol. 49, No. 4, pp. 217-224, Journal of the Operations Research Society of Japan, 2004.

Japanese Office Action issued Aug. 18, 2011 in related Japanese Patent Application No. 2006-244780 (3 pages).

Official Communication issued Jul. 19, 2012 in related European Patent application No. 05 739 051.0-1243 (4 pages).

Japanese Office Action mailed May 21, 2013 in related Japanese Patent Application No. 2006-244780 (3 pages) (1 page English Translation).

"Task Computing for freely associating information devices, Computer & Network LAN", Masanobu Yuhara, Japan, Ohmsha,Ltd, Oct. 1, 2004, vol. 22, No. 10 (pp. 97-103) (1 page English Translation).

"Introduction to "Semantic Web", a new technique to create a smart Web", $6^{th}$, Itaru Hosomi, Nikkei Internet Solutions, Japan, Nikkei Business Publications, Inc, Aug. 21, 2003 No. 74, (pp. 104-109), (2 pages English Translation).

Notice of Allowance mailed Jun. 3, 2013 in related co-pending U.S. Appl. No. 10/733,328 (34 pages).

\* cited by examiner

BUILDING COMPUTING APPLICATIONS BASED UPON METADATA

CROSS-REFERENCE TO RELATED APPLICATION(S)

This application is related to and claims priority to U.S. provisional application entitled "BUILDING COMPUTING APPLICATIONS WITHOUT PROGRAMMING" having U.S. Ser. No. 60/785,973, by Yannis Labrou, Ryusuke Masuoka, Zhexuan Song and Guang Huang, filed Mar. 27, 2006 and incorporated by reference herein.

This application is related to U.S. Ser. No. 11/512,405, entitled TASK COMPUTING, by Ryusuke Masuoka, Yannis Labrou, Zhexuan Song, and Sung Youn LEE filed Aug. 30, 2006 in the U.S. Patent and Trademark Office, the contents of which are incorporated herein by reference.

This application is related to U.S. Ser. No. 11/115,403, entitled TASK COMPUTING, by Yannis Labrou, Ryusuke Masuoka, Duy HUYNH, and Zhexuan Song, filed Apr. 27, 2005 in the U.S. Patent and Trademark Office, the contents of which are incorporated herein by reference.

This application is related to U.S. Ser. No. 10/733,328, entitled TASK COMPUTING, by Ryusuke Masuoka, Yannis Labrou, Zhexuan Song, filed Dec. 12, 2003 in the U.S. Patent and Trademark Office, the contents of which are incorporated herein by reference.

BACKGROUND

1. Field

The embodiments discussed herein relate to building computing applications using metadata.

2. Description of the Related Art

A computer application is almost always a virtual representation of a physical or real world domain, presented to a user through a user interface. Interactions of the user with this virtual representation, through the user interface, result to the user effecting the virtual representation which some times may result to effects in the real world.

Consider the following example:

A user logs in to a web banking application, offered by her bank, accessible through a web browser. After logging in, the user clicks on the account number and sees the balance on the account and the recent transactions. The records displayed to the user, are the records of the real world account that the user opened at some point in the past. The user can select a specific transaction, say a "check paid" and the user can see additional information about the transaction or even an image of the cancelled check. This image is a virtual world representation of the actual physical check that the user wrote in the real world. The transaction record displayed in the browser is the virtual world equivalent of the transaction that actually took place in the physical world: e.g., a check was issued, the payee received the check, deposited the check to the payees account and eventually money was transferred to the payee account.

A user's interaction with the virtual representation of a physical world domain, through a user interface, to effect the physical world, can also be observed when a users books a ticket for airfare on the web, buys a book from a website, uses a desktop application to buy songs, or manages digital pictures, or talks to a customer service representative that handles an insurance claim.

In all of these cases a user interacts with a computer system application that has been created to enable specific actions within a well defined domain. The basic elements of such a computer system application are always the same.

FIG. 1 is a diagram of functional tiers or layers in a computer system application 50 in a computer 51. In FIG. 1, a typical computer system application creation involves creating a data model 52, application logic 54 and presentation logic 56, as follows: A data model 52, i.e., a virtual representation of a domain's objects referred to as domain model 52, is first conceived. In the case of the web banking application, these domain objects are accounts, customers, transactions, checks, and so on. The domain model 52 includes all relevant details of these objects and often some dependencies between them, i.e., every account number must have a customer associated with it. Often, but not always, the domain model 52 is represented in a database schema; the instances of these objects, e.g., a specific customer's information, are stored in a database. A database is usually taken to be a relational database management system (RDBMS) but a database can be any computational artifact that allows the permanent storage and retrieval of data. For example, a file in a file system can be used as a database. In practice, such systems often involve more than one "databases." This layer of the computer system application can be referred to as the data layer 52.

The core of the application is the application logic layer 54. This is the computer executable code that executes the processes that the user interacts with through the user interface or the presentation layer 56. For example, whenever a users chooses to make a bill payment from within the web banking application, the code in the application layer 54 will execute a pre-defined process for executing bill payment. This process will receive the input from the user interface 56, such as who is the payee, the amount and the date, and then will check that funds are available, will perhaps recalculate the expected date of the payment, debit the customer's account for the amount being paid and so on. This process has been pre-defined by designers of the application 50 according to the requirements of the specific bank and the bank's real-world processes. Essentially, the application layer 54 executes a collection of pre-defined processes, some of them simple, some of them complex. Some of the processes might be data look-up and display processes, for example, whenever the customer selects an account number in the user interface 56, a process of the application logic 54 will retrieve the information for this account from the data layer 52 and display the information to the user via the presentation layer 56. Regardless of the complexity of the application layer 54 processes and of their nature (transactional versus informational), the application logic layer 54 is where these processes are defined and their execution takes place (or initiated). It is important to note that the processes that the application layer 54 of a specific application 50 is capable of encoding and executing are limited within the scope of the domain of the application layer 54, the domain being the data model 52. This is very important, because it means that extending the range of processes that can be executed in a specific domain of the application layer 54 requires that the domain model 52 needs to be similarly extended, which is not trivial. This layer of the system application can be referred to as the application layer 54.

Finally, the third layer of an application is the presentation layer 56, also commonly referred to as the user interface (UI). It is the UI that enables the users of the application 50 to interact with the processes of the application tier 54 and see the results of their actions.

This discussion can be summarized as follows. Users at the presentation tier 56 execute fixed (created at design time by developers) processes that are implemented at the application tier 54 and result in accessing or modifying data in the data storage tier 52.

Typically, adding functionality (new processes) has to be reflected in both application 54 and presentation tiers 56 and is limited by the domain model in the data tier 52. As a result, for example, integration of an application with other applications, or extending the application capabilities (processes the application can handle) is custom and expensive because of tight coupling between the application 104 and the data storage tier 52.

Further, creating applications has always been the domain of computer executable code developers. But the larger problem with the approach of using computer code developers is that there can be a disconnect between the users of computing infrastructure and the engineers that create the computing infrastructure. Specifically, a user thinks of information technology (IT) in terms of the things (tasks, actions) that the information technology enables the user to do, while engineers approach IT as an infrastructure that supports a variety of operations. In practice this means that building applications involves three tiers of actors, i.e., users, consultants (e.g., sales engineers, product managers), who interact with the users to formalize the kinds of functionality that users want to be made available to them, typically in the form of specifications of supported processes (such as business processes) and engineers, that translate these formalized requirements to functional specification and eventually into computer executable code. Moreover, building applications in this manner is an iterative process, as specifications, prototypes and implementations are continuously refined to better meet customers' needs and expectations. This approach suffers from two inherent limitations: (1) there is a disconnect between users and implementers both literally (physically), but also in terms of the conceptual language for understanding the system application and its functions (e.g., business objects vs. data records), and (2) resulting systems are limited to the set of functions that they were originally designed for, hence their extensibility is limited and costly.

SUMMARY

The embodiments leverage metadata to enable a user create the functionality the user wants from the system application the user uses. According to an aspect of the embodiments, individual services are deemed as building blocks, that when supplemented with metadata, can enable the user to easily specify, create, search, and/or implement the processes the user wants using graphical tools that assist the user in the process specification, creation, search, and/or implementation operations, without the need for programming. Even if end users might be unwilling to use themselves such tools, consultants with problem domain knowledge, but no coding skills, can work with the users to quickly assemble processes and test them, for example, in minutes (very rapid prototyping). The output of the graphical tools is process specifications that are immediately executable and can be shared with other users or deployed for immediate use by an organization. In this paradigm, engineering/IT focuses on creating services and metadata for these services, on a need-basis, without being guided by a master plan for servicizing a complete set of business functions. Integrating third party services becomes a matter of providing the metadata for the third party services. Users and/or consultants focus on describing (and simultaneously implementing) the processes they need and occasionally create requirements for specific building blocks (services) they want the programmers to provide.

It is an aspect of the embodiments discussed herein to provide tools for graphical process composition and user interface composition.

Specifically, there are three main components to the embodiments:
1. a graphical environment for creating processes
2. a search capability for finding process from available services
3. a graphical environment for associating processes with an application's user interface.

According to an aspect of the embodiments, any user without programming creates applications supported by Web services.

The embodiment associate a semantic service description (SSD) with a service, wherein the SSD comprises a semantic description of the service, including a semantic description of a parameter of the service, according to a computer interpretable language, and, as a service grounding, a mapping between the computer interpretable language expressing the SSD and an interface, including an interface parameter, of the service. A dynamic composition of a task based upon a user selection of a plurality of services is supported and a dynamic association of the task with a user interface of an application is supported, based upon associating the user selection of a display screen, an object, and an event of the application user interface with the task.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

A TASK COMPUTING computer system which is discussed in the related copending U.S. patent application Ser. Nos. 11/512,405, 11/115,403 and 10/733,328 relies on Web Services and Semantic Web technologies to enable end-users to combine, on-the-fly, functionality from devices, applications and electronic (e)-services and execute complex tasks based thereon.

The embodiments build on the TASK COMPUTING computer system environment by further leveraging metadata to enable the user create the functionality the user wants from the system application the user uses. According to an aspect of the embodiments, individual services are treated as building blocks, that when supplemented with metadata, for example, a semantic service description (SSD), can enable the user to easily create the processes the user wants without programming by using graphical tools that assist the user in this process creating operation. Even if end users might be unwilling to use themselves such tools, consultants with problem domain knowledge, but no coding skills, can work with the users to quickly assemble processes and test them, in minutes (very rapid prototyping). The output of the graphical tools is process specifications that are immediately executable and can be shared with other users or deployed for immediate use by an organization The embodiments provide a benefit of allowing engineering/IT focus on creating services and metadata for these services, on a need-basis, without being guided by a master plan for servicizing a complete set of business functions. Integrating third party services becomes a matter of providing the metadata for the third party services. Users and/or consultants focus on describing (and simultaneously implementing) the processes they need and occasionally create requirements for specific building blocks (services) they want engineering to provide. As a result, the embodiments reduce the cost of application development by substantially reducing programming at the application logic layer 104.

Thus, the embodiments provide a new approach for building computing applications. One distinguishing benefit of the embodiments is being usable by non-programming users, because the process of creating and extending a resulting computing application is done through graphical tools that do not require that the creator of the application understand computer executable code or to develop such code.

Specifically the embodiments provide:

1. creating immediately executable processes through graphical representations, including the ability to save and share, across users and across computing environments, the resulting processes.

2. a search engine and a search capability for finding processes (task) from available services in response to a user query.

3. associating processes with an application's user interface through graphical representations.

Figure 2:
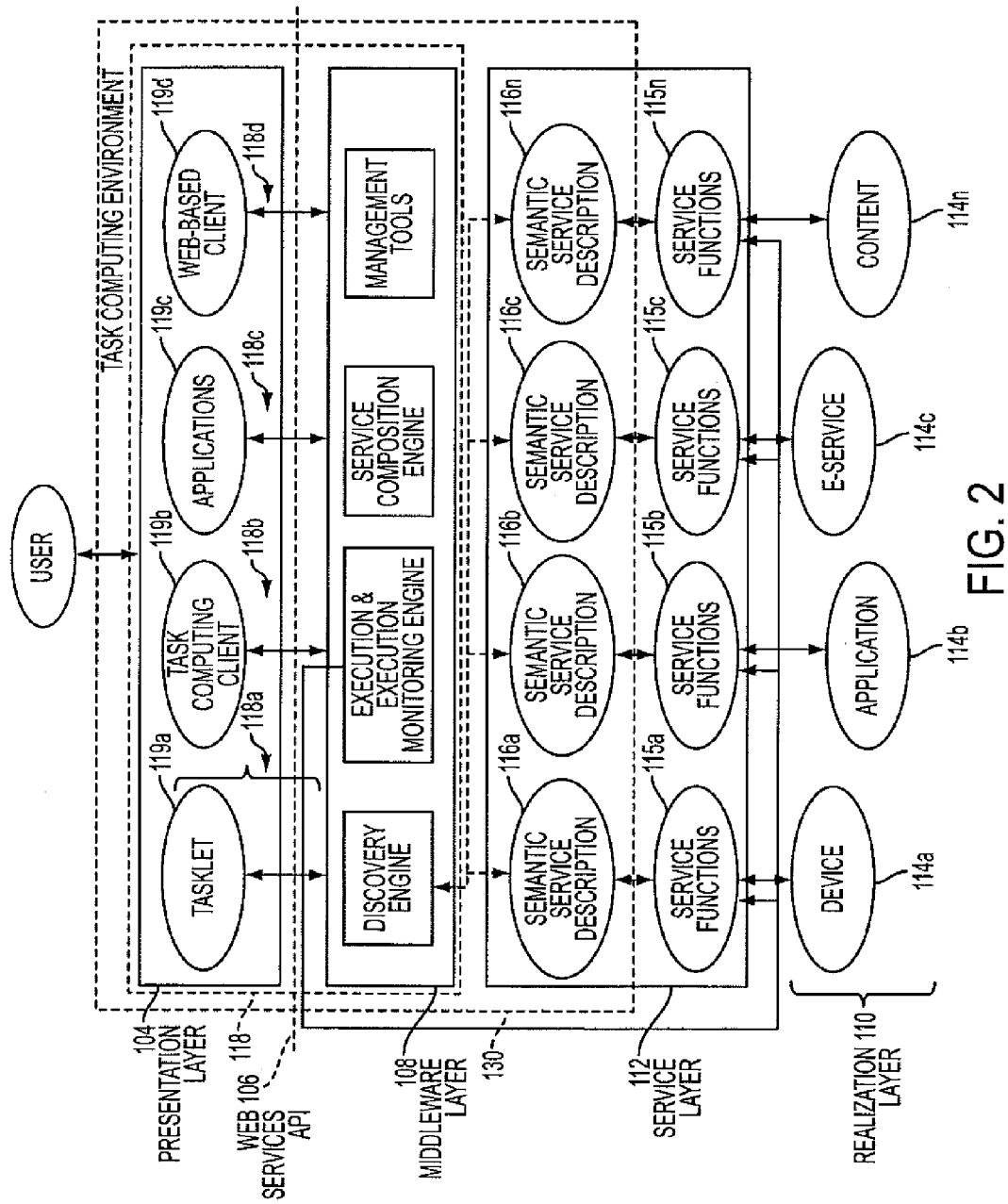
FIG. 2 is a diagram of TASK COMPUTING computer system environment (TCE) architecture, according to an embodiment.

The embodiments discussed herein access an environment that supports the discovery, manipulation and execution of metadata-enhanced services. The Task Computing environment is one such computing environment, in which Ontology Web Language (OWL) is used for describing metadata of services and OWL-S (OWL-based Web Service Ontology) is used for describing services and processes. However, the embodiments are not limited to OWL and OWL-S and any language for defining and instantiating information can be used. FIG. 2 is a diagram of TASK COMPUTING 100 computer system environment (TCE) architecture, according to an embodiment. In FIG. 2, a computer implemented method comprises segmenting a computer system environment into a plurality of Task Computing computer system implementation tiers comprising a presentation processing layer 104, a remote procedure call mechanism application programming interface (API) 106, and a middleware (server) processing layer 108. The remote procedure call API can be a Web Service API 106, which interfaces the presentation layer 104 to the middleware layer 108 for real-time, dynamically generating a computer implemented task interface 130 to service functions(s) 115 of a computer system 110 (e.g., a software or a programmed computing hardware interface, a computer display screen graphical user interface (GUI), computer voice user interface). The computer system 110 can be networked, non-networked, or both 110, and can be a device, an application program, an electronic service, or content, or any combinations thereof.

According to an aspect of the embodiments, the computer system 110 is a function source realization layer comprising one or more computing sources of functionality 114 (e.g., a device, software 114) that represents or can present, for example, to a user, a service function 115. A service layer 112 comprises a semantic service description (SSD) 116 associated with a service function 115 to semantically describe the service function 115. Thus, an SSD 116 semantically represents, or describes, the service function 115. More particularly, the service layer 112, which includes the SSD 116 and the service function 115, is constructively a service 112 to be managed by the middleware processing layer 108 (e.g., created, discovered, published, etc.). In other words, the middleware processing layer 108 interfaces, based upon a respective SSD 116 and a service function 115, with the service layer 112, for a real-time, dynamic composition of an executable task 126 that comprises one or more services 112. According to an aspect of the embodiments, a task 126 is composed at the presentation layer 104.

In FIG. 2, the service layer 112 is sources of functionality 114 made computationally available as service functions 115 via Semantic Service Descriptions (SSDs) 116. The SSDs allow discovery and access to (execution of) the service functions 115. Each service function 115 is associated with at least one Semantic Service Description (SSD) 116, which, for example, is encoded according to OWL-S, which is a Web service ontology language based upon Web Ontology Language (OWL) using the Resource Description Framework (RDF)/Extensible Markup Language (XML) exchange syntax, and a SSD 116 can be created on-the-fly, via PIPE-WS TCC 118b, as services 115 might be created (made available) dynamically. The SSD embodiment described is not limited to an OWL-S implementation and any computer interpretable language construct for describing properties and capabilities of computer system service functions 115, including Web services, can be used. The SSD 116 comprises three parts: profile, process and grounding, where the profile part allows users to manipulate the service 115 in semantic layer and the grounding part allows users to actually invoke services 115. Services 115 represent available functionality in the Task Computing universe 100, and SSDs 116 of these services 115 are meant to shield the user from the complexity of the underlying sources of service functionality 115 and make it easy for the user to employ these service sources 115 in accomplishing interesting and complex tasks. An embodiment(s) of Semantically Described Services 116, is described in related pending U.S. patent application Ser. Nos. 10/733,328, and 11/115,403, the entire contents of which are incorporated herein by reference.

Task Computing 100 is a new paradigm to real-time, dynamically, discover, publish, compose, manage, and execute complex tasks in application-, device-, electronic service-, and content-rich computer network environments 114 (i.e., execute tasks in realization layer 114). Task computing 100 is based upon semantically describing (e.g., through Semantic Service Descriptions (SSDs) 116a-n) service functions 115a-n of computing devices 110 that according to their semantics can be composed on-the-fly by end-users into executable tasks. Therefore, according to the embodiments described herein, Task Computing 100 system has a multi layer computer system architecture of three or more programmed computing and/or computer readable information layers of a presentation client processing layer 104, a middleware server processing layer 108 to which the client layer 104 interfaces via a remote procedure call mechanism, and a plurality of services 112 in a plurality of computer systems layer 110.

According to an aspect of the embodiments, the following functions are provided:

A "service" 112 based upon an association of an SSD 116 with a service function 115. In other words, an SSD 116 is an example of a metadata for a service function 115, thereby an SSD 116 represents a "service." Therefore, according to the embodiments, the term "service" 112 refers to computational embodiments of functionality from universe of function source realization layer 110 of computer devices 114a, computer applications/software 114b, electronic-services 114c and computer (or machine or both) readable content 114n.

A "task" or "process" 126 based upon a stored composition of one or more actions according to discovered computer system services 112 that, for example, a user wants to perform. According to the embodiments described herein, a "task" 126 is, automatically driven, user driven, or any combination thereof, composed and managed via a computer implemented task interface 130 to the service functions 115. In case of user driven operations, a task 126 as a composition of one or more services 112 is managed (e.g., discovered, published, composed, executed, etc.) by the user at the presentation layer 104. According to an aspect of the embodiments, a task 126 is a composition of one or more services 112 that can accept, as input, objects of a user interface (UI). According to an aspect of the embodiments, a task 126 can be a service 112 via a tasklet by providing a service function 115 based upon one or more service functions 115.

A "composition" is formed by putting together a plurality of services 112 according to provided functional characteristic(s) of services 112 as semantically described, such as (without limitation) semantic inputs and outputs of a service 112, for example, data object type for input (consumption)/output (production) of the service 112. An example of a functional characteristic of a service can be a precondition and an effect of the service 112 to determine service composability. An example of a precondition and an effect of a service 112 can be input and output data object types for a service 112. Service input refers to the input parameters for a service 112, e.g., a service 112 that returns information about a book will typically require as input the ISBN for the book (or the book title). Service output refers to the output of the service 112 (after its invocation) if any, e.g., a service 112 that returns information about a book might return the book title, the book author, a pointer to an image file of the books cover and so on.

A "semantic instance" or "semantic object" is a set of descriptions on some item or object based on one or more ontologies. A Semantic Service Description (SSD) 116 describes a service function 115 based upon one or more service function ontologies. According to an aspect of the embodiments, a semantic instance is metadata for an object based upon an ontology.

A "publication" is making the Semantic Service Description (SSD) 116 available for discovery by one or more service discovery mechanisms.

An "semantic service description" (SSD) 116 is a description in a file form that includes an ontology-based metadata for a service function 115, including parameters of the service function 115. Therefore, according to an aspect of the embodiments, an SSD 116 is a vehicle to communicate parameters of a service function 115 from the service function 115 itself to a Task Computing System (TCS) 118. More particularly, an SSD 116 includes a semantic (ontology based) description of the service function 115, including a semantic description of a parameter of the service function 115, according to a computer interpretable language, and, as a service function 115 grounding, a mapping between the computer interpretable language expressing the SSD and an interface, including an interface parameter, of the service function 115. The SSD can be created either by the creator of the service function 115, or by anyone else. A single service can have many SSD's associated with it; this is natural since an SSD is metadata and metadata always makes sense in a certain context.

A "discovery" generally refers to discovery of a Semantic Service Description(s) 116.

An "object" can be a concept that has meaning in the physical world (such as a specific book or person) and its computer system implementation or reference to that implementation.

An "event" is an action effected by an input device (such a keyboard or mouse or voice), such as typing or right-clicking.

A "system" is the combination of all three layers of an application and the physical computer systems in which the application is implemented and the user interacts with.

A "canvas" is the visible elements of a User Interface.

A "service's metadata" is the SSD of a service.

"Web services" is a software system designed to support interoperable Machine to Machine interaction over a network. Web services are frequently just Web APIs that can be accessed over a network, such as the Internet, and executed on a remote system hosting the requested services.

"Semantic Web" refers to an evolving extension of the World Wide Web in which web content can be expressed not only in natural language, but also in a form that can be understood, interpreted and used by software agents, thus permitting them to find, share and integrate information more easily. At its core, the Semantic Web comprises a philosophy, a set of design principles, collaborative working groups, and a variety of enabling technologies. Some of these technologies, referred to as "Semantic Web technologies" include Resource Description Framework (RDF), a variety of data interchange formats (e.g. RDF/XML, N3, Turtle, N-Triples), and notations such as RDF Schema (RDFS) and the Web Ontology Language (OWL), and OWL-S (an OWL-based) web services ontology. All these technologies are intended to formally describe concepts, terms, and relationships within a given problem domain.

An "Application" is any application that among other things can communicate with sub system 108 via 108's APIs.

A "Web client" is a client (a computer system that accesses a (remote) service on another computer by some kind of network) capable of communicating using web protocols. An example of a web-based client 119*d* is an Internet browser such as MICROSOFT INTERNET EXPLORER.

A "Task Computing Client" is any client that can communicate with sub system 108 via 108's API's.

According to an aspect of an embodiment, metadata is provided for a service function 115 (SSD 116) and for a target application's user interface object(s). The metadata at a minimum specify information about the data that are at a higher level of abstraction than the datatypes of the data. For example, the data "20740" may have a datatype of string, i.e., the sequence of characters "2", "0", "7", "4", "0", or a datatype of integer, i.e., the number 20740. In the context of a target application to which a task 126 is to be associated, in addition to its datatype, the data "20740" might have associated with it metadata that denotes that 20740 is a "zip code". Moreover, in reference to an ontology, a "zip code" might be defined as an attribute of an object called "address," which might have additional elements such as "Street address", "State" and "Country". In this context, "20740" is the value of a "zip" attribute of an "address" object, rather than simply being a string or an integer. According to another aspect of an embodiment, details included or specified in metadata information is managed according to any ontology for controlling extent of task 126 association with the target application UI objects on a continuum from limited (restrictive) to open (unrestrictive), based upon the graphical environment for creating/searching processes (tasks) 126 and associating such tasks with a target application user interface.

In FIG. 2, according to the embodiment(s) described herein, one or more Task Computing Systems (TCSs) 118*a-n* are provided according to a client-server computer system architecture based upon a remote procedure call mechanism. A TCS 118 is logically and in implementation segmented into a presentation processing layer 104 providing client type programmed processes as Task Computing Clients 119*a-n* and a middleware processing layer 108 providing server type programmed processes, in which the segmented presentation and middleware processing layers 104, 108 are interfaced according to any remote procedure call mechanism, such as Web services (WS) as a Task Computing Environment-Web Service Application Programming Interface (TCE-WS API) 106*a-n*. The concept of Web services is well known. Therefore, according to the embodiments described herein, generally a TCS 118 comprises a Task Computing Client (TCC) 119 providing client type processes at the presentation layer 104, and the TCC 119 interfaces with the middleware server processing layer 108 via a remote procedure call API, such as Web services (WS), in which case the TCC 119 is referred to as a WS TCC 119. A TCS 118 that uses Web services, as an example of a remote procedure call mechanism, is herein referred to as WS TCS 118. By using a remote procedure call mechanism, such Web services, any application, including third party applications (e.g., MICROSOFT WORD, EXCEL, OUTLOOK, ADOBE ACROBAT, etc.) that can make a remote procedure call, such as Web service calls (or can incorporate remote procedure invocation capability) could become a Task Computing Client (TCC) 119. The embodiments described herein use Web services as an example of a remote procedure call mechanism, however, the embodiments are not limited to such a configuration and any remote procedure call mechanism can be used.

Through the use of Web services Task Computing Clients (WS TCCs) 119 as programmable computing components (e.g., Task Computing Client software) at the presentation layer 104, users can manage (e.g., discover, publish, compose, execute, manipulate) tasks 126 based upon semantically described services 116 made available by the middleware server processes 108 through TCE-WS API 106 in any one or a plurality of computing environments.

In FIG. 2, according to today's computing environments, a user is surrounded by functionality referred to as the realization layer 114, which comprise devices or computer-mediated services, such as electronic services (e-services) available over the Internet, applications that run on computing devices that the user operates, content available on a computer readable medium, or simply devices that support a specific function. Examples of such devices, application, e-services, and content, include (without limitation) telephones, computer displays, cameras, entertainment devices/centers, televisions, Personal Digital Assistants (PDAs), radio communication devices (e.g., mobile phones, etc.), audio players, fax machines, printers, weather services, map services, office suite computing software (e.g., email application, address book, etc.), multimedia computer readable media (e.g., music compact disc, movie digital video disc (DVD), etc.), Internet sites, databases, object information, etc.

In FIG. 2, according to the embodiment described herein, the service layer 112 comprises a service function 115*a* from the function source realization layer 114 and a semantic service description 116*a* correspondingly semantically describing the service function 115*a* of the function source realization layer 114, as the service 112 of the computer system (as networked, non-networked, or both) 110. According to an aspect of the embodiments described herein, the relationship between service function 115 and SSD 116 can be many to many (n:m) for a particular function source 114. For example, one SSD 116 to a plurality of service functions 115 where one saves a service function 115 composition (with a plurality of service functions 115 in the composition) as an SSD 116. And one service function 115 to many SSDs 116, where one gives a plurality of kinds or types of semanticization of a singe service function 115. For example, in a case where a book lookup service function 115 (which returns authors, prices, photos, etc. for an ISBN input) can be grounded by semantic services 116 such that one returns the author contact, and another SSD 116 returns an image, etc. More particularly, according to the embodiments described herein, a service layer 112, comprises service functions 115*a-n* available by the realization layer 114*a-n* and Semantic Service Descriptions (SSDs) 116*a-n* corresponding to the service functions 115*a-n*, together forming available computer system (as networked, non-networked, or both) 110 services 112. The SSD 116 exposes on a computer network a service function 115 of a realization layer 114. Certain embodiment(s) of SSD 116 is/are described in the related pending U.S. patent application Ser. Nos. 10/733,328, 11/115,403, and 11/512,405 the entire contents of which are incorporated herein by reference.

Therefore, Task Computing 100 is a new paradigm for how a user interacts with service functions 115*a-n* of realization layer sources of functions 114*a-n*, for example, a computing device 114, that emphasizes a task 126 that the user wants to accomplish while using the computing device 114 rather than emphasizing the specific means for how to accomplish the task. Task computing 100 fills the gap between what users want done and a service function 115 of a computing device 114 that might be available in their environments. Task computing 100 presents substantial advantages over traditional approaches, such as the current personal computing paradigm, namely, it is more adequate for non-expert computer users, it is a time-saver for all types of users and is particularly suited for the emerging pervasive computing type of computing environments.

In FIG. 2, therefore, according to the embodiments described herein, to provide a computer system architecture (software and/or programmable computing hardware) that would be flexible to extend and build upon, a distinct and modularized middleware server processing layer 108 is created whose functionality is made available to the presentation processing layer 104 through remote procedure call application programming interfaces (APIs) 106; so that application developers and users can use them to access Task Computing functions, such as service 112 discovery and composition into executable tasks 126, including construction, save, execution, monitoring, publishing, management, etc. of services 112 and/or tasks 126. A remote procedure call mechanism, such as for example Web services, provides location (i.e., different processing layers on different computers), platform, and programming language independence required for end-user application development.

As discussed above, ubiquitous pervasive networked computer computing environments are populated by a multitude of devices and other functionality (e-services, applications, content) 114, 115 that is often transient in nature; moreover, end-users, or even, developers that are creating an application for a ubiquitous environment might not know in advance what functionalities (resources) 114 and corresponding service functions 115 could be available at a given time and more importantly what they can be used for. To take advantage of this dynamism, it is necessary that service functionalities 114, 115 can be discovered and combined at runtime rather than design time. Therefore, the embodiments described herein use, as an example, Semantic Web technologies, because if computer network resources 114, 115 are sufficiently self-described by machine-readable semantics 116, it is possible to build an infrastructure 100 that understands enough about the resources 114, 115, as computer system services 110, to permit end-users do what application developers typically do by bringing their own understanding of what resources 114, 115 provide and can be used for. The concept of Semantic Web is well known.

More particularly, according to the embodiment(s) described herein, the Task Computing 100 utilizes the well known concepts of Semantic Web and Web services. However, to deliver a real, functioning system in a truly dynamic and ad-hoc ubiquitous computing environment, according to the Task Computing 100 described herein, the following are established and implemented:

(1) As shown in FIG. 2, providing a task interface 130 to computer system sources of functions 110. The task interface 130 comprises a Task Computing System (TCS) 118 logically segmented into (1) a presentation processing layer 104 that comprises a Task Computing Client (TCC) 119 and (2) a middleware server processing layer 108 to which the TCC 119 at the presentation layer 104 interfaces with a remote procedure call mechanism API 106. The API 106 exposes the middleware server processing layer 108 to be interfaced by the presentation processing layer 104. The task interface 130 also comprises a Semantic Service Description (SSD) 116 layer that semantically describes service functions 115. An SSD 116 is discovered by the middleware processing layer 109 to be presented at the presentation layer 104 via a TCC 119 and a service function 115 is executed, for example, as part of a task 126 to be executed, by the middleware processing layer 108 according to a control command provided, for example, at the presentation layer 104 via the TCC 119 and based upon the SSD 116 for service function 115 to be executed.

(2) Separation of semantic service descriptions (SSDs) 116 and service implementations 115 to provide together a service layer 112;

(3) Separation between discovery (of a service or a saved task, as the case may be) mechanisms and discovery ranges, and manipulation capability of services 112 within and between those ranges by conceiving a concept of "sphere" as a subset of remote procedure call API running on computers 110 and accessible by remote Task Computing Clients 119 to achieve discovery ranges for services 112.

(4) Ability for users (and applications) to dynamically create and manipulate services 112 that can be made available and shared with others (or made unavailable when necessary) (i.e., provide service control management); and (5) Providing a variety of services 112 that enable interesting and truly useful tasks 126.

Therefore, as shown in FIG. 2, the separation of the above-described layers is both logical (conceptual) and in implementation, useful in building a Task Computing 100 where the user can perform complex tasks that have not been (neither implicitly nor explicitly) designed into the computer network system, thus multiplying the uses of the sources of functionality 114, 115 (devices, applications, content and e-services). The present invention is not limited to the Semantic Web and other semantic type technologies or framework that allows data to be shared and reused across application, enterprise, and community boundaries can be used by the embodiments described herein.

In FIG. 2, the function source realization layer 114, as the bottom most layer encompasses the universe of computer devices, computer applications/software, electronic-services and computer (or machine or both) readable content, where all functionality available to the user originates. Service functions 115 (described in more detail below) of the function source 114 are computational embodiments of functionality. Such service functionality 115 generally emanates from at least three different types of sources 114: devices, applications (software) and over-the-Web e-services. These three sources 114 are loosely defined and unlimiting categories, because the boundaries between them can be highly malleable. In an example, device 114 originating services 115 are the core functionality that the device 114 is designed to deliver. For example, a phone's (device) 114 main functionality is making phone calls (service) 115. Similarly, application (software) 114 originating functionalities are service functions 115 of the software 114 that is executing on a computing device 114. For example, a personal information management (PIM) application's functionalities, includes storing and retrieving contact information of persons. Finally e-services and/or content(s) 114 service functionality 115 is, for example, a service function 115 that is executing on some remote server to deliver the service functionality 115 through access to the Web, beyond the boundaries of a user's local network. Contents as a fourth source of functionality 114 can be very useful, namely content that is made available as a service function 115; this type of service function 115 can be very convenient as an information-sharing mechanism between users. Therefore, "services" 112 herein refers to computational embodiments of functionality from universe of function source realization layer 114 of computer devices, computer applications/software, electronic-services and computer (or machine or both) readable content. Therefore, a "service" 112 as a computational embodiment of functionality from a function source realization layer 114 has interface characteristics for interacting with the "service" 112, which can comprise a description of the "service," including name of the service, function(s) performed, etc., and functional characteristics of the service, such as input/output to the "service" 112. Further, according to the embodiments described herein, a computer implemented user interface to a computer system service 110 is according to ontology based semantically described input data and output data of a "service" 112. For example, a service 112 described in an SSD 116 can be "Get book information from vendor 1," which can accept as input a book's ISBN, name, or other book related data, and output book information from the vendor 1. For example, AMAZON can be a vendor that can provide book information.

In FIG. 2, the service layer 112 computationally avails the sources of functions 114 based upon Semantic Service Descriptions (SSDs) 116 of the service functions 115. The SSDs allow discovery and access to (execution of) the service functions 115. Each service function 115 is associated with at least one Semantic Service Description (SSD) 116, which, for example, is encoded according to OWL-S and, for example, using the Resource Description Framework (RDF)/Extensible Markup Language (XML) exchange syntax, and a SSD 116 for a service function 115 can be created on-the-fly, to dynamically and in real-time provide services 112. The SSD 116 embodiment described is not limited to an OWL-S implementation and any computer interpretable language construct for describing properties and capabilities of computer system service functions 115, including Web services, can be used. The SSD 116 comprises three parts: profile, process and grounding, where the profile part allows users to manipulate the service function 115 in semantic layer and the grounding part allows users to actually invoke service function 115. Service functions 115 represent available functionality in the Task Computing universe 100, and SSDs 116 of these service functions 115 are meant to shield the user from the complexity of the underlying sources of service functionality 115 and make it easy for the user to employ these service sources 115 in accomplishing interesting and complex tasks. According to an aspect of the embodiments, the SSD 116 represents a service function 115 to provide a service layer 112, and the service layer 112 represents a source of function 114. The service layer 112 can simply be referred to as a service 112.

In FIG. 2, middleware server processing layer components 108 are responsible for discovering services 115, 116 (or 112), deciding how services 112 can be composed into executable tasks, executing the services and monitoring service execution, and enabling and facilitating a variety of management operations, including the creation and publishing of semantically described services 116. In other words, the purpose of the middleware processing layer components 108 is to abstract all service resources 115 as semantically-described services 116 that can be made available (e.g., at the presentation layer 104 via TCCs 119) to either users or the applications that seek to manipulate the service resources 115. According to an aspect of the embodiments, a task (process) composer application (described in more detail herein) composes one or more tasks 126 that can accept as input, based upon metadata of UI objects, one or more of the UI objects for building an application.

In FIG. 2, the presentation processing layer 104 utilizes the capabilities of the middleware processing layer 108 to enable users to execute tasks by combining all available service functionality 116, 115 (112). A variety of programmable computing clients 119 (e.g., software clients, programmable computing hardware clients, or both, etc.) using Web services 106, referred to as WS TCCs, WS applications, and/or WS web-based interface applications (accessible with a web browser) (herein all referred to as a WS TCC) are provided to execute tasks by combining all available service functionality 112 via the middleware processing layer 108. According to an embodiment described herein, the middleware layer components 108 are exposed through well-defined Web services application programming interfaces (WS APIs) 106, thereby allowing creation of WS Task Computing Clients (WS TCCs) 119 that utilize these APIs 106 to manage the services 112.

Therefore, a TASK COMPUTING system designates a type of computer system 100 that supports automatic or user driven or both (any combination thereof) real-time, dynamically, discovering, publishing, composing, managing, and executing a "task" 126 that comprises one or more services 112 based upon semantically described 116 application-, device- and service-rich computer computing (computer system) environments 110.

The embodiments provide (1) a Process Composer; (2) Task Search; and (3) User Interface (UI) generator for an application. In FIG. 2, using Web services as an example of a remote procedure call API, a Process Composer 118b is an example of a WS TCS 118, which comprises a SNAPFIT Task Computing Client (SNAPFIT-WS TCC) 119b at the presentation processing layer 104 interfaced, via a WS API 106, with the middleware server processing layer 108.

Figure 3:
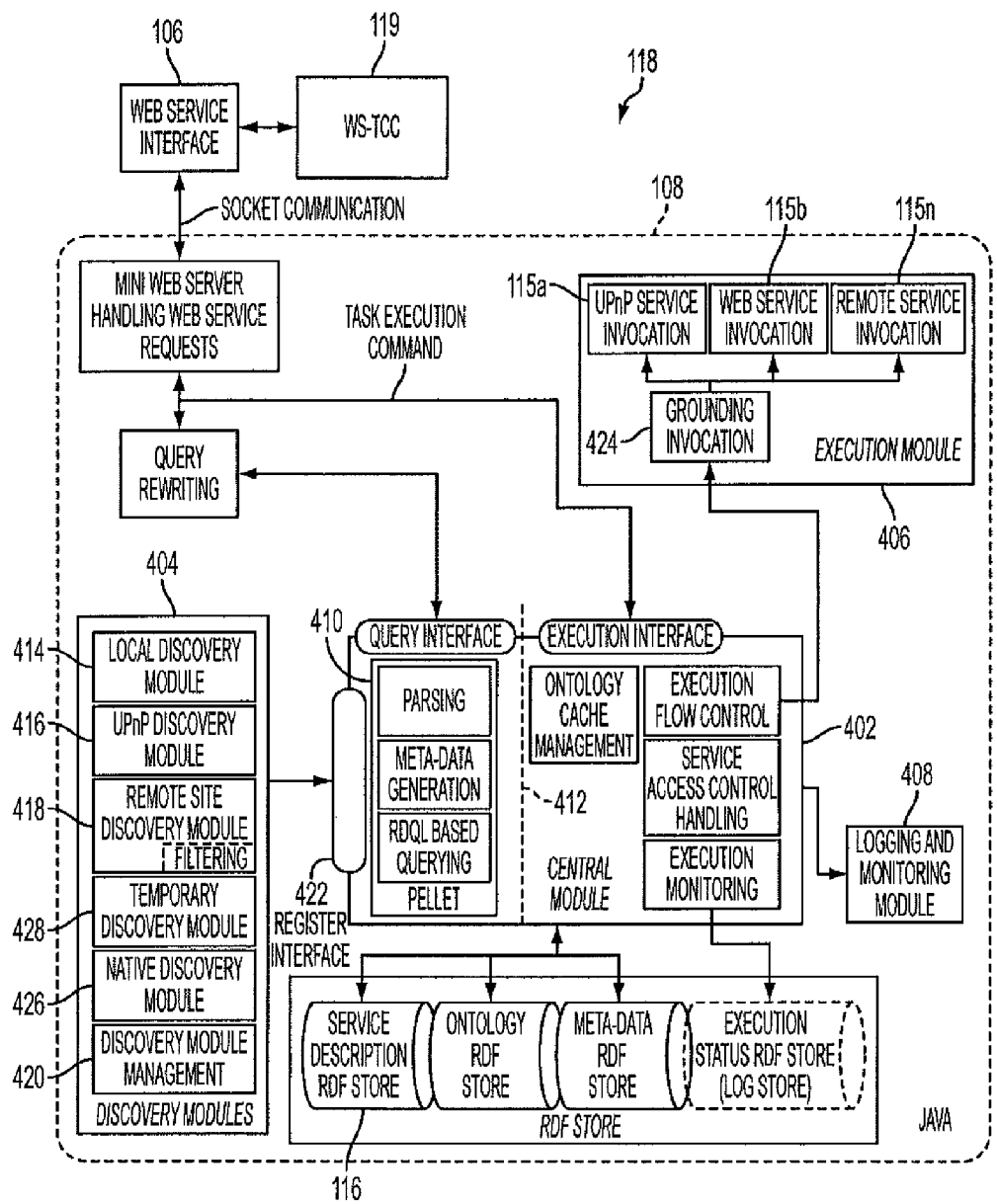
FIG. 3 is a functional block diagram of middleware processing layer program modules in the TASK COMPUTING computer system, according to an embodiment.

FIG. 3 is a functional block diagram of middleware server processing layer 108 program modules, according to an embodiment. As shown in FIG. 3, the middleware processing layer 108 of the SNAPFIT-WS TCC 119b comprises a central module 402 that controls, according to Web services 106 requests from the presentation processing layer 104, service 112 discovery modules 404, execution modules 406, and monitoring modules 408. The central module 402 comprises service 112 parsing and indexing modules 410 and service 112 composition and task 126 execution planning 412. The service 112 parsing and indexing modules 410 provides a registering interface 422, which allows discovery modules 404 to register/unregister discovered services 112. Discovery modules 404 comprises a set of individual discovery modules, such as local discovery module 414, any third party service function 115 discovery module 416, such as UPnP, remote site discovery modules 418, and a discovery module management 420 that has a management function of determining whether each discovery module should be used or not in a different environment 110.

In FIG. 3, according to an aspect of the embodiments described herein, the service discovery modules 404 discover service functions 115 by discovering associated SSDs 116 according to a plurality of discovery mechanisms comprising one or more of a local service discovery 414, third party service discovery 416, remote site service discovery 418, temporary service discovery 428, or native service discovery 426, or any combinations thereof. The local service discovery 414 opens a "socket" port and listens for an SSD 116 publish message from an application launched on same apparatus (computer) on which the local service discovery module 414 is being executed. For example, when an application launches, the application published certain SSDs 116 and sends an SSD published message to a predefined "socket" port opened by the local service discover 414 to receive communication. According to an aspect of the embodiments, the SSD published message received by the local service discovery 414 from the application contains location(s) of the published SSDs 116. Then, the local service discovery module 414 makes the SSDs 116 available to a TCC 119.

In FIG. 3, the third party discovery 416 uses a third party discovery standard to discover SSDs 116. The third party discovery mechanisms 416 can be, for example, as Universal Plug and Play (UPNP) technology, JINI technology, BLUETOOTH, etc., or any combination thereof. For example, a CYBERLINK UPNP and/or INTEL UPNP TOOLKIT implementation can be used in third-party discovery module 416 to discovery service descriptions broadcast within the sub-network by UPnP. The remote site discovery 418 uses a web service protocol (a web service call) to a remote web service to discover SSDs identifiable by a web service interface.

In FIG. 3, according to an aspect of the embodiments described herein, JENA, by HEWLETT-PACKARD DEVELOPMENT COMPANY, is used to store SSDs 116. The parsing and indexing modules 410 comprise parsing and analysis functions to parse and analyze SSDs 116. For example, according to an aspect of the embodiments described herein, an SSD 116 is parsed using JENA, by HEWLETT-PACKARD DEVELOPMENT COMPANY, with support of PELLET and OWL-S API by MINDLAB, UNIVERSITY OF MARYLAND, USA. In particular, "a service 112 is discovered" is equivalent to "the SSD 116 semantically representing a service function 115 of a function source 114 (e.g., a device, software 114) is found." A SSD 116, which is discoverable by one of the service discovery modules 404, is sent to the central module 402, through the register interface 422, where the SSD 116 is first parsed, for example, by JENA with PELLET support. Once the SSD is parsed, PELLET is ready to answer RDQL queries. By asking queries from the service parsing and indexing module 410 and based upon the query results, the service composition and task execution planning module 412 completes a composition of services 112 as a task 126, and determines the execution plan for the task 126 in response to a task 126 execution command from a TCC 119. Once an execution plan is determined, the central module 402 invokes a related service function(s) 115, via the execution modules 406 that comprises a grounding invocation 424 provided in the SSD 116 to invoke a service function 115. The discovery modules 404 discover services 112 that can comprise service functions 115 and Semantic Service Descriptions (SSDs) 116. The above description of the service 112 parsing and indexing 410 are not limited to such a configuration and any mechanism to parse and analyze SSDs 116 can be used other than JENA and PELLET.

In FIG. 3, according to an aspect of the embodiments described herein, as an independent module, a WS TCC 119 can use any kinds of underlying service 112 discovery mechanisms 404 or execution mechanisms 406 as long as a unified and high-level abstracted discovery and execution mechanisms are implemented according to a Web services API(s) 106, for example, by implementing a Web Service interface 106 for underlying BLUETOOTH SDP, IR, RENDEZVOUS, JINI, etc. 404, 406. Therefore, for example, the only thing a user needs to specify is the Uniform Resource Locator (URL) of the Web Service Definition Language (WSDL) files for STEER-WS API 120 to interface with the service layer 112 (e.g., discovered services 115, 116). As along as the Web Service API 106 is provided, the whole underling discovery procedure by the TCE-WS API 106 is transparent to the user at the WS TCC 119 in presentation processing layer 104. For example, one of TCE-WS API 106 can be using BLUETOOTH discovery modules 404 to find and execute BLUETOOTH based services 112. Another TCE-WS API 106 can be using UPnP discovery modules 404.

Figure 4A:
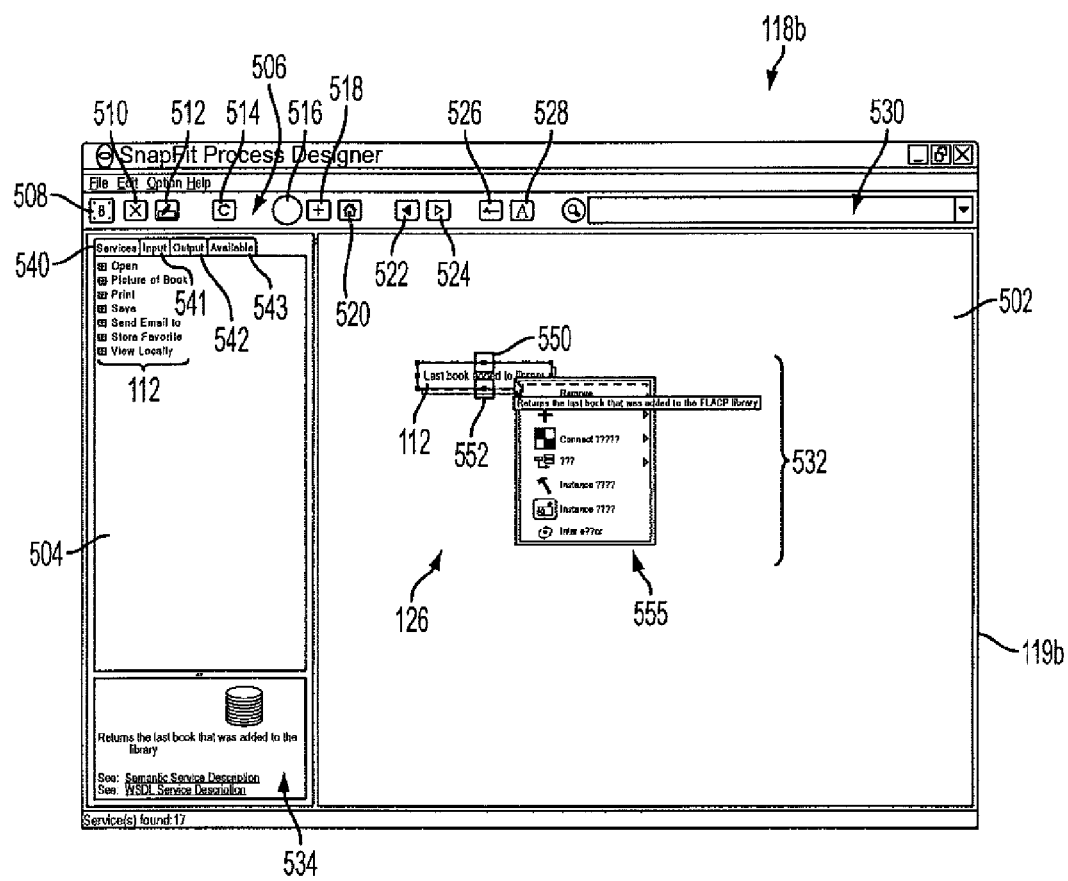
FIG. 4A is a diagram of a user interface for a process composer, according to an embodiment.

FIG. 4A is a diagram of a user interface for a process composer, according to an embodiment. In FIG. 4A, a process (task) 126 composer 118b is referred to as a SNAPFIT process designer 118b, which provides a graphical user interface (GUI) task computing client 119b at the presentation layer 104 enabling a non-programmer to create an immediately executable process (task) 126 entirely through a graphical manipulation of the services 112 that are available for creating processes 126. According to an aspect of the embodiments SNAPFIT process designer 118b continuously assists the user in the process creation.

According to an aspect of the embodiments, an SSD 116 is used as follows:

Some Terms:

(1) The services 112 in a composition area 502 of SNAPFIT composer are a process in creation (in progress) 532 for a process (task) 126.

(2) Available services 112 are the subset of all discovered services 112 that can be inserted across possible multiple insertions (looking ahead) to the process in creation 532.

According to an aspect of the embodiments, the SNAPFIT composer uses the SSD's 116 of all known service functions 115 to continuously determine the available services 112 for the process in creation 532 (dynamic real-time available metadata-based service update, simply referred to as auto-update). As SNAPFIT determines the available services, SNAPFIT also determines how each available service might be added to the process in creation, i.e., how the service's 112 inputs and outputs will be connected to services 112 of the process in creation 532.

According to another aspect of the embodiments, the SNAPFIT composer 118b can determine how to complete a process in creation 532 without a user's action. According to an aspect of the embodiment, a complete process 126 can be a process that has no orphan inputs or outputs, and the process is executable. Effectively, auto link (auto completion) is that when the remaining available services can be added to the process in creation 532 only in one unique manner, the SNAPFIT composer will add such remaining available services in that manner. "Manner" refers to when the inputs and outputs of available services 543 can be connected to the inputs and outputs of the services 112 in the "process in creation" 532 in one unique way (dynamic real-time metadata based auto-link and/or completion simply referred to as auto-link).

The combination of auto-update and/or auto-link allows a user to build the process 126 by simply selecting a service 112 from the available services 543, thus focusing on the capability that the user wishes to add to the process in creation 532, as this capability is represented by the service 112, without being concerned about how exactly to connect this service 112 to the other services 112 in the process in creation 532. Also, the order of adding each new service 112 in the process in creation 532 is not a point of concern for the user, thus further enabling the user to focus on the capability/function of each service 112 that the user wants to add, rather on where to put the service 112. In the SNAPFIT paradigm the user simply selects a service 112 from available services 543, without consideration of a specific order of selection and the remaining decisions (which service should connect to what service and how, i.e., which output to which input and so on) are made by the SNAPFIT composer.

Some of the features of the User Interface of the SNAPFIT composer provide functions that are intended to help the user with this different process creation paradigm:

For example, the back and forth buttons, allow a user to go back and forth over different stages of the process in creation 532 so that the user can inspect each stage, or if so the user chooses, to modify a choice made at a previous stage. For example, the user can go back and select a different service 112 from available services 543 (at that stage of the process creation) and then continue on a different path.

The layout feature, takes care of the placement of the services 112 and the respective connections between inputs and outputs of services 112, so that when a user selects an available service (by double-clicking on the available service), the selected available service is automatically placed in the composition area 502 at a location that makes for a visually comprehensible graph representation of the process 532, perhaps also by re-arranging the placement of the services 112 already in the process composition area 502. The displaying of nodes and arcs for a visual representation of a graph is known.

In FIG. 4A, the different windows of the GUI 119b of the process designer 118b including the functions of each window area of the user interface are explained. Broadly speaking, the large area (composition panel) 502 is the area in which the user specifies the process by linking services 112 to one another, often assisted by the system which will automatically link services 112 whenever possible or limit how services 112 can be linked depending on the services' 112 metadata, for example, services' inputs and/or outputs. According to an aspect of the embodiment, the composition panel 502 displays a process-in-creation tree 532 that graphically represents linked services 112 of a process 126, including input/output ports 550 and 552 that represent a service's input/output, respectively. According to an aspect of an embodiment, the input/output ports are graphically represented and differentiated (e.g., by color differentiation) as squares in a service rectangle in the composition panel 502. The embodiments are not limited to a tree representation, but any representation that graphically displays or presents creation of a process 126 based upon metadata of one or more services, including input/output of the services, can be provided.

In FIG. 4A, the GUI 119b also includes a service area 504, typically in the left, where the user can interface with service related information, for example, the services 112 available to the user, under the available service tab 543, at each step of the process 126 creation are shown (the listing of services dynamically changes) as the user acts on the composition panel 502 and buttons for executing and testing the resulting process 126.

Each area of the interface 119b is discussed next.

Control buttons area 506 (top left) are (grouped, from left to right):

Execute Process 508, Stop Execution 510, Save Process 520 relate to a composed process 126.

Refresh All Services 514

Redo Layout in Composition Panel 516, Auto-complete Process 518, and Clear Composition Panel 520 are actions in composition panel 502.

Redo 522 and Undo 524 are applicable for actions in Composition Panel 502.

Smaller, Bigger Font buttons 526, 528 manipulate text size in the composition panel 502.

On the rightmost of toolbar, there is an auto search combo box 530 which searches the available services 112 (services 112 that can be added to current composition graph 532) depending on what the user types in the box. Selecting a service 112 (e.g., highlighting and hitting the enter button on the keyboard) from the results returned by the auto search combo box 530 (in the form of a drop-down list) can be another way for adding an available service to the composition panel 502.

On the left top of discovered services area 504, four tabs give different view of services 112 to a user.

Services tab 540: show all discovered services 112

Input tab 541: grouped by input type (as described in the service's metadata description, e.g., person, ISBN, book).

Output tab 542: grouped by output type (as described in the service's metadata description, e.g., person, ISBN, book).

Available tab 543: available services 112 to current composition 126

A left bottom detailed service window 534 shows detailed information of selected services 112 in tree 532 of composition panel 502.

The user an any point in the process 126 creation may type a string to in the auto search box 530 to find "available services" (services that the system determines that can be added to the process-in-creation based on the services' metadata) and match the description and/or metadata of the service, or, can select a services from the all the "available services" in the services listing on the left. As each service is selected, it is added to the process creation panel and if possible, as determined by the system it is automatically, if possible, connected to the other services already in the composition panel. When a process is complete it is ready for execution or for saving. Color can be used to illustrate to the user when a process is complete and when a service can be connected to other services. For example, a service 112 that cannot be connected to other services, i.e., all of its available inputs and outputs are already connected to the inputs and outputs of other services in the composition panel 502, might be displayed in red, while services 112 that can be further connected to other services in the composition panel 502 might be displayed in gray.

Figure 4B:
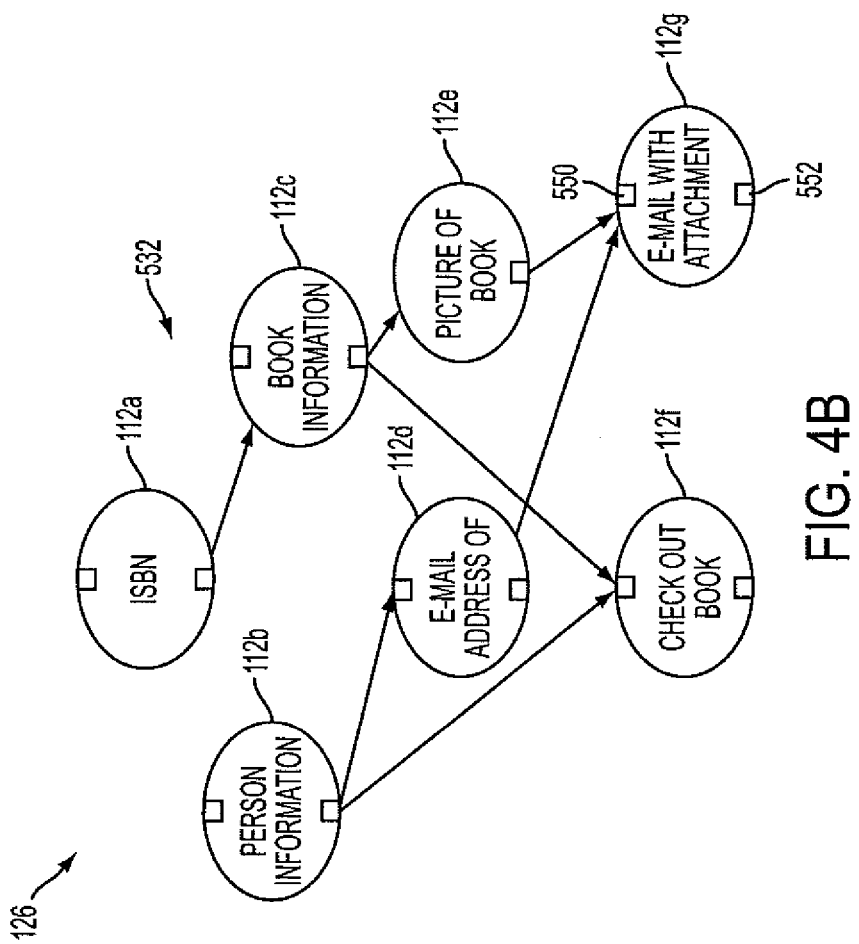
FIG. 4B is a diagram of a graphical user interface representation of a composed task, according to an embodiment.

FIG. 4B is a diagram of a graphical user interface representation of a composed task, according to an embodiment. In an unlimiting example, in FIG. 4B the task representation 532 is a composition of services 112 including "ISBN," "Get book information from vendor 1," "Picture of Book," "Email with attachment," "Person Information," "Email address of" and "Check out Book," which provide a task 126 of "Check out this book by that person. Also email to that person a picture of this book." In FIG. 4B, the task 126 accepts, as input, the outputs from services "Person Information" and "Book Information" 112.

As mentioned, as the user attempts to create a process 126 the system can:

(1) auto-update: update the services 112 available to the user at each step of the process creation (the listing of services 112 dynamically changes) as the user acts on the composition panel 502. According to an aspect of an embodiment, auto-update provides available services 112 that are the subset of all discovered services 112 that can be inserted across possible multiple insertions (looking ahead) to the process in creation 532. And (2) auto-link: automatically link processes whenever possible or limit how services can be linked depending on the services' metadata included in the corresponding SSDs 116.

Finding available services 112 based on a current service composition 126 is discussed next. As services 112 are added in the composition panel 502 they may not be connected to other services, for example, if it is possible that they might be connected to other services in multiple ways. In this case the composition panel 502 should be thought of as containing not a single process-in-creation 532 as a process (task) 126 (in technical terms a tree of connected services) but a collection of multiple processes-in-creation 532 (in technical terms a forest, i.e., multiple trees of connect services). Of course, due to the users selections some or all of these trees might become connected to a single tree (process) eventually.

The auto-update operations for updating the list of available services 112 at the current step of a composition 126 are discussed. This available service update operation takes place after each insertion of a service 112 in the composition panel 502, as follows:

Start with the current composition 126, which can be assumed to be a forest (this is a general case; if the current composition is a tree, it is simply a forest with one tree).

Find all largest trees in this forest (a largest tree is any tree that cannot be further extended).

A largest tree is found as follows:
(a) Find all the services which have no output edge to another service (such services will be a root of a largest tree in the forest).
(b) For each root service (i.e., for each of the services in the result of the previous step), do a recursive search (using either BFS or DFS) to find the largest tree whose root is this service. The concept of BFS or DFS is known).

Find all available services for each tree in the forest (from the previous step). The goal is to derive the intersection of available services for the forest, i.e., the current composition or process-in-creation, by intersection of the available services for each tree.

Finding the available services for each tree in the forest is accomplished by finding all services that can link to the current tree using either BFS or DFS. The procedure is repeated for each tree in the forest.

Finally, intersect the available services for each tree; this intersection is the new set of available services.

BFS and DFS refer to Breadth First Search and Depth First Search respectively.

The auto-link operations for determining how a given service 112 (service X) selected from any of the services 112, including available services 112, in the service area 504 is automatically linked to other services 112 in the composition panel 502, depending on the services' metadata, is described, as follows:

Start with an empty Auto link queue.
Put service X into auto link queue.
Perform the following operations until auto link queue is empty.
For every service X in auto link queue.
For every empty port in service X.
If only one port 550/552 in composition panel 502 can match to this port of the service X in the auto link queue,
Then, link the two (2) ports.
Else, if only one port in a service Y, for example, from available services 543 can match to this port of the X service in the auto link queue, add this specific available service Y to composition panel 502 and link the two (2) ports.
Add this available service Y to auto link queue.
Remove service X from auto link queue.

It should be noted that the iterative nature of the described auto-link does not search ahead only one step, but in multiple steps to identify services 112 that are candidates for auto-link. Further, according to an aspect of the embodiments, typically the auto-link operations link a selected service 112 to a process-in-creation 532 (126) if there is only one way to be linked.

Adding a service 112 to a composition 126 is described next. Every time that a service 112 is added to the composition 126 in the composition panel 502, the system performs the following actions:
1. Add service 112 to the composition 126 in the composition panel 502.
2. Do auto link for this added service 112.
3. Update available services 112 in the available service tab area 504.
4. Update GUI representation (e.g., composition tree, etc.) 532 of the composition 126 in the composition panel 502.
6. Apply the procedure for the layout of the composition 532 in the composition panel 502 (for example, the procedure uses a known algorithm to position each service's 112 rectangle representation in the composition panel 502).

Removal of a service or an edge from the process-in-creation 532: Removing elements of a process-in-creation, i.e., services or edges (i.e., connections between services' inputs and outputs) from composition panel 502 is discussed next. It is possible, at any given time the user might choose to remove a service 112 or edge from the composition 126 in the composition panel 502, as follows:

Create an empty queue of elements to be removed and add a target removed element to the queue.
For each element in the elements to be removed queue:
If the element is a service,
Add associated edge (an edge that links to the service) to elements to be removed queue
If element is an edge,
If associated service (service that the edge links to) is internal service (an internal service is a service that is part of the composition but might not be explicitly displayed in the composition panel 502, such as an ontology translation service),
Add associated internal service to the elements to be removed queue.
Update available services.
Update the composition 126 GUI 532 in the composition panel 502.
Update the layout of the composition panel using any known layout operation.

SNAPFIT composer UI actions: For each user action at the user interface 119b, such as selecting an item, right-clicking on an item, etc., there is a related action listener. The concept of a UI listener is well known. What happens as the user performs such action on the SNAPFIT UI objects, such as services, processes-in-creation, etc., is described next.

Double click a service 112: if the clicked service 112 is available, do "Add a service to composition panel" operation.

Clicking a service 112, which appears in either in the composition panel 502 (as linked or not linked to a process-in-creation tree(s) 532, as the case may be) or in any of panels 540, 541, 542, 543, selects the service 112. For example, selecting a non-linked service 112 in the composition panel 502 may result to any of the following actions:

Highlight services 112 in trees 532 which can immediately link to an unoccupied port in this selected service 112.
Highlight available ports 550/552 in composition panel 502 which can be composed to this service 112.
Show service information in information panel 534.

Selecting a service while it appears in any of panels 540-543 will result to showing information of this service in information panel 534 and highlighting the service 112 in composition panel 502 (if it also happens to appear in composition panel 502 also).

Clicking on a selected item that is a port 550/552 (an input or output of a service 112), by either selecting the items in 541 or 542, or from a service in composition panel 502 via the selectable ports 550/552, results to selecting the port and to any the following actions:

Highlighting of the port 550/552 in composition panel 502.
    If port 550/552 is unoccupied, highlight services 112 in trees which can immediate link to this port 550/552.
    Highlight ports 550/552 in composition panel which can be composed (but not immediately, i.e., another intermediate service might be required for connecting the two ports) to this port.
    Show related service information in information panel 534.

Right-clicking on a selected service in the composition panel 502 results to the display of a popup menu 555 with following options:

Remove: remove this service from composition panel 502.
    Add: a list of the services which can immediately link to an unoccupied port 550/552 of the service. If a service in that list is already in the composition panel 502, it will be also highlighted.
    Split: A list of the services which can immediately link to an unoccupied port of the service. If a service in that list is already in the composition panel, it will be also highlighted. For the option to be available, the selected port must be unoccupied. A split effectively creates a new branch in complete process.

Figure 5:
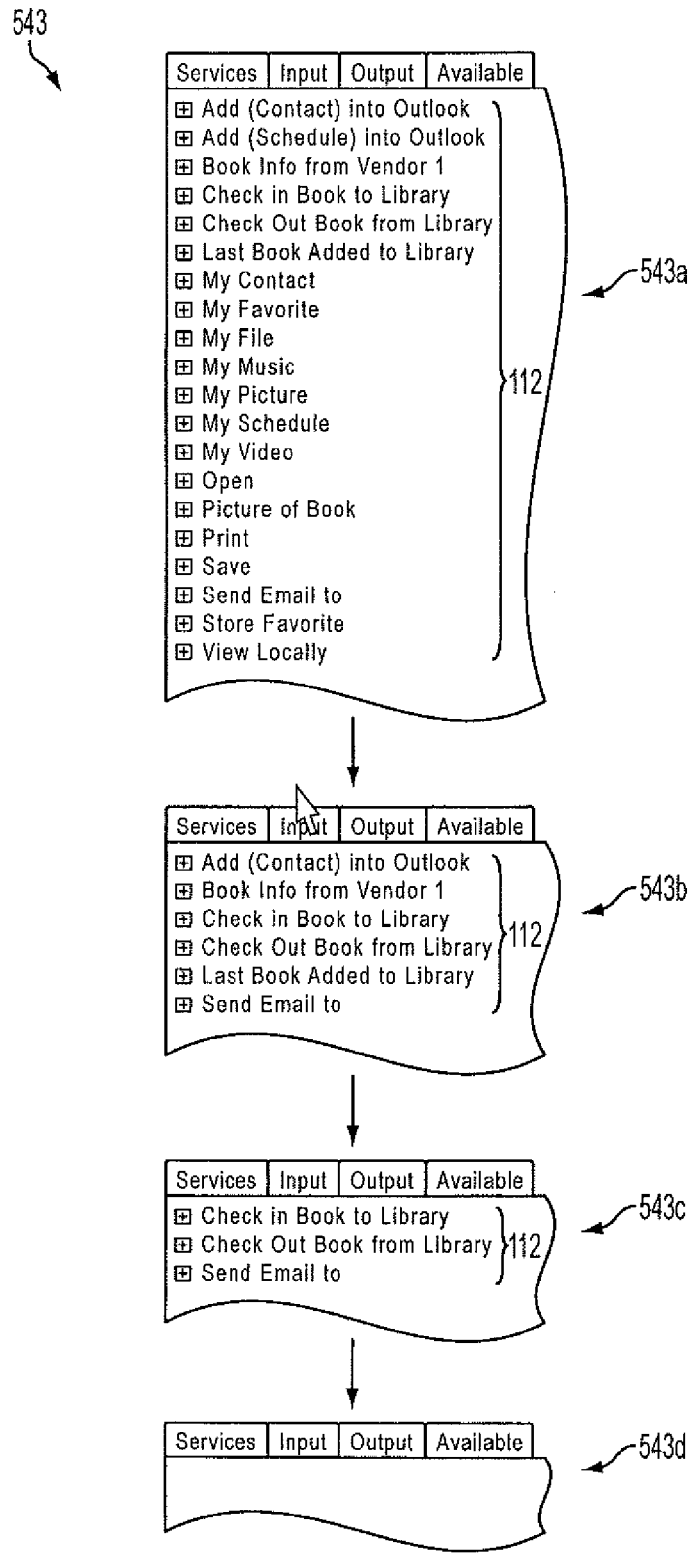
FIG. 5 is a diagram of available service window transitions during a process composition, according to an embodiment.
Figure 6:
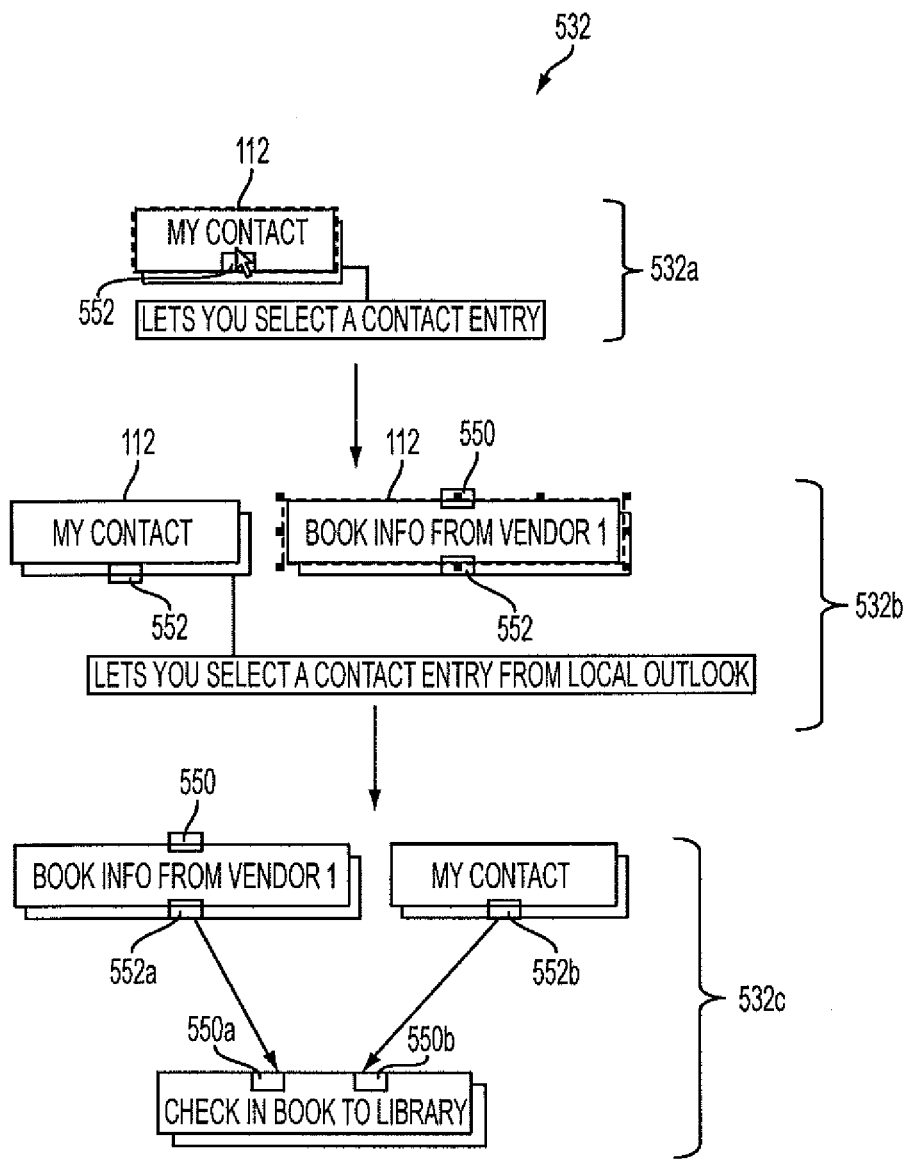
FIG. 6 is a diagram of stages of a process composition, according to an embodiment.

A detailed example of a process 126 creation using the SNAPFIT process designer 118b with figures of the related parts of the user interface 119b of the SNAPFIT process designer 118b is discussed next. FIG. 5 is a diagram of available service tab window transitions during a process composition, according to an embodiment. FIG. 6 is a diagram of corresponding composition tree transitions during a process composition, according to an embodiment. In FIG. 5, the available services 112 window 543a displays selectable available services 112. For example, by adding "My Contact" service to composition panel 502, perhaps by double-clicking onto "My Contact" in window 543a, a new service 112 "My Contact" is added in form of a composition tree 532 to the composition panel 502 of the SNAPFIT process designer 118b as shown in FIG. 6. In FIG. 6, a composition tree leaf 532a of a composition tree 532 is displayed. After selecting the "My Contact" service in the available services window 543a, the available services 112 are automatically updated in the window 543b. In other words, the window 543b is the update listing of available services in the SNAPFIT process designer after a new service 112 has been added to the composition tree 532 in the composition panel 502.

In FIG. 6, now the composition panel 502 only has 1 tree 532a and the available services 112 has been updated to the listing of available services 543b. According to an aspect of the embodiment, the services 112 "Add (Contact) into Outlook," "check in book to library," "check out book from library," "send email to," are retrieved, and then "Book info from Vendor 1," and "Last Book from library" are found. Available services are services available for the next composition step, but also for multiple next steps, so these last two services can be listed even though they might not immediately be connectable to anything in the current process-in-creation 532a.

In FIG. 5, the user adds (by selecting from available services window 543b) "Book Info from Vendor 1" service 112 to the composition panel 502, resulting to an update of available services 112 in the available services window 543c. In FIG. 6, the updated composition panel 502 only has 2 trees "my contact" & "book info from vendor 1" 532b.

In FIG. 5, the user adds "check in book to library" service 112 to the composition panel 502 (SNAPFIT can also use auto link operation, discussed herein). In particular, when the new service is added to the composition tree 532 of the composition panel 502 of the SNAPFIT process designer, the "auto link" function can automatically connect the new service to the existing services in the composition panel 502 to display the composition tree 532c. Adding of the new service "check in book to library" to the composition tree 532b, generates the new composition tree 532c and results to an updated available services tab window 543d with no available services for the composition tree 532c.

In FIG. 6, the updated composition panel 502 has only 1 task 126 composition tree 532c and no services available, based upon the available services tab window 543d, to this tree 532c. The composition tree leafs or nodes can be graphically differentiated to help the user in task 126 composition. For example, in FIG. 6, for the task 126 composition tree 532c, a lighter color can suggest that the service can not be further linked to other services because of all of its ports (connectors) 550/552 that represent the services inputs and outputs are occupied. A darker color can suggest that the service can be connected to other services. Thus, for the tree 532c, the "My Contact" and "Check in Book to Library" services cannot be linked to other services, however, the "Book Info from Vendor 1" can be linked to another service 112.

An example of an auto link operation is described, according to an embodiment. In previous examples of FIGS. 5 and 6, when adding "check in book to library," service 112, for the port "book item input" 550a of "check in book to library" service 112, in composition panel 502, only the port "book item output" 552a of "book info from Vendor 1" can match to it, so the two ports 552a and 55a are linked as shown by task composition tree 532c. Further, same as port "contact input" 550b of "check in book to library" and output port 552b of "Myc contact" service 112.

Figure 7:
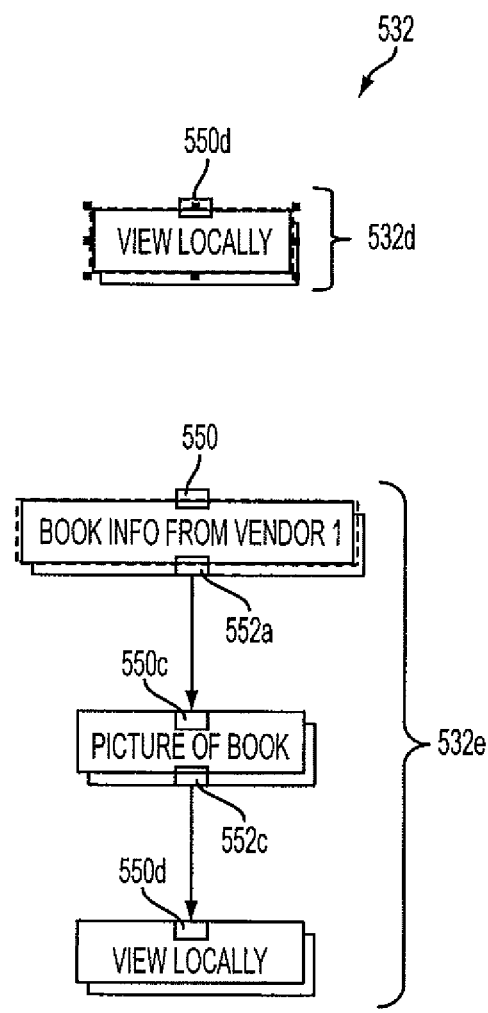
FIG. 7 is a diagram of stages of a process composition that demonstrate an auto-link feature, according to an embodiment.
Figure 8:
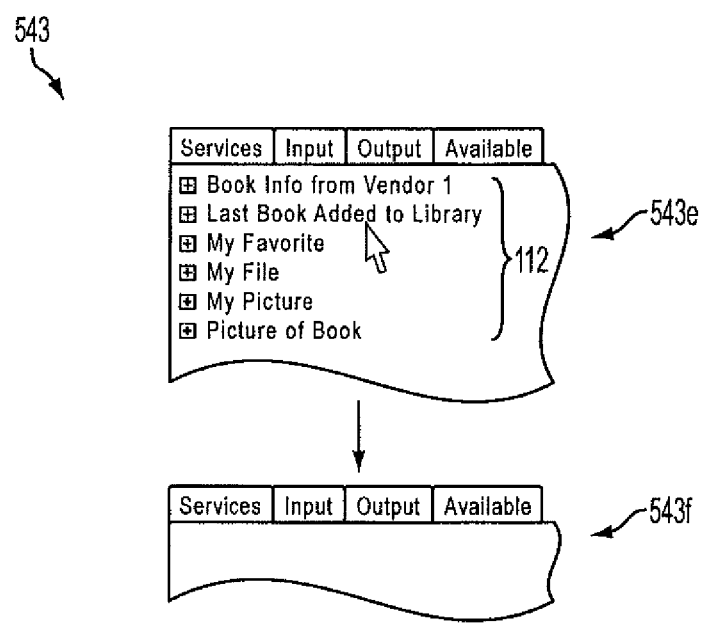
FIG. 8 is a diagram of available service tab window transitions during a process composition that demonstrate the auto-link feature, according to another embodiment.

FIG. 7 is a diagram of composition tree transitions during an auto link process composition, according to an embodiment. FIG. 8 is a diagram of corresponding available service tab window transitions during an auto link process composition, according to another embodiment. In FIG. 7, for example, user adds "view locally" service 112 to a task composition tree 532d.

In FIG. 8, the available service tab window 543 is updated to the window 543e to indicate that more than one service is available that can match the "view locally" service, namely "My favorite," "my file," "my picture," and "picture of book" services 112. Then, in FIG. 7, the user adds "Book info from Vendor 1" service to the composition tree 532e. Initially, no service can match "Book info from Vendor 1" in the composition tree 532e. The system looks into available service: only one service "picture of book" can be matched to the "book item output" 552a port of "book info from Vendor 1," and adds "picture of book" by input port 550c to composition tree 532e and link ports 552a-550c between both services, thus forming the composition tree 532e. For "picture of book," only "file input" port 550d of "view locally" can be matched to "picture output" 552c of "picture of book," so the system links ports between "view locally" and "picture of book." Finally, the composition tree in the composition panel 502 is updated, and in FIG. 8, the list of available services 543f is updated to be empty, because currently no other services can be linked to the process-in-creation 532e.

Tasklets and Task Packages:

When a user creates a process 126 the user can choose to save the created process 126 as a tasklet for further use, sharing or reuse. In effect a tasklet in form of a file is a process 126 specification that can be executed by either its creator, or another user, and can also be further edited by its creator or another user. The preferred way for invoking a tasklet is by double-clicking an icon associated with the tasklet. When invoked by a user that has installed the Task Computing system middleware 108, the tasklet can execute the process contained in the tasklet.

A tasklet can be further edited too. This is possible because of additional metadata incorporated in the tasklet, namely workflow information. The workflow information includes: (1) the number of services 112 comprising the task, (2) IDs of these services 112, and (3) how the services 112 are linked together to form the task 126. With the workflow information, the SNAPFIT Process Designer can now recover the original design of a task 126 contained in the tasklet as a workflow of linked services 112.

Using workflow information, one can now easily share the details of tasks 126. The workflow information requires all of comprising services 112 to be present in order to display the details correctly. It is because the workflow information gives only the service ID and relies on retrieving other important information, such as names, descriptions, inputs/outputs, from individual service descriptions 116, which provides a benefit of sharing the details of tasks 126 in a compact manner. However, this approach could possibly limit the portability and the ability to edit tasks 126 (if all service descriptions 116 in the tasklet are not readily available to the user editing the task 126). The solution to this problem is the "task package." A task package is a zipped file with three types of files in it: a tasklet, descriptions of all related services 112, and an index file. The index file stores mappings between service IDs (recorded in the tasklet's workflow information) and related service descriptions 116.

When the task package is opened in SNAPFIT Process Designer, the tasklet file is extracted first. SNAPFIT Process Designer checks whether all services that the tasklet needs are available (i.e., they are discovered and they appear in the "available services" pane 543 of the SNAPFIT Process Designer). If they are already discovered, no action is taken. Otherwise, from the index file, SNAPFIT Process Designer will find the SSDs 116 of all missing services 112 and publish them. After all the missing services 112 are published and discovered, SNAPFIT Process Designer then resumes the tasklet loading procedure. During the building of the task package in a SNAPFIT Process Designer, the task package format allows SNAPFIT Process Designer to detect all the related services 112 and zip those service descriptions 116 in the task package along with the tasklet and the corresponding index file automatically. When the task package is run or opened in a SNAPFIT Process Designer, the SNAPFIT Process Designer can automatically determine the missing services 112. The tasklet and task package are discussed in the related copending U.S. patent application Ser. No. 11/512,405.

Task 126 Search:

In the auto-search box 530 of the SNAPFIT process designer 118*b*, users can type a string and the system will dynamically display the services 112 that match this string. It is also possible that as the user types a search string, and dynamically, or by displaying a search result after the user types "enter," the system displays to the user a listing of tasks 112 that the search query matches. This search can be run against existing (previously defined tasks and tasklets), but also it can be run against the space of possible tasks 126, which refers to tasks 126 that are feasible given the set of services 112 that the user has already selected in the composition panel 502 of the composer and the set of available services 112 given the services 112 already in the composition panel 502.

A search engine for identifying services 112 and/or tasks 112 in response to a user query is described next. This facility might be accessible through an interface, such as the auto-search box 530 in the composer 119*b* of the SNAPFIT process designer 118*b* but also through any other API. In a way the task search embodiment bears similarities to web search engines, except that the user searches for tasks (processes) 126 that they can and want to execute. Unlike web search where the search space is that of existing documents, the embodiments notion of task search implies a search space that includes tasks 126 that are not defined yet, but are feasible given the user's then current (discovered and/or selected) services 112. The term task 126 should be thought of as interchangeable with processes, where a process should be thought of as a connected tree of services 112.

Figure 9:
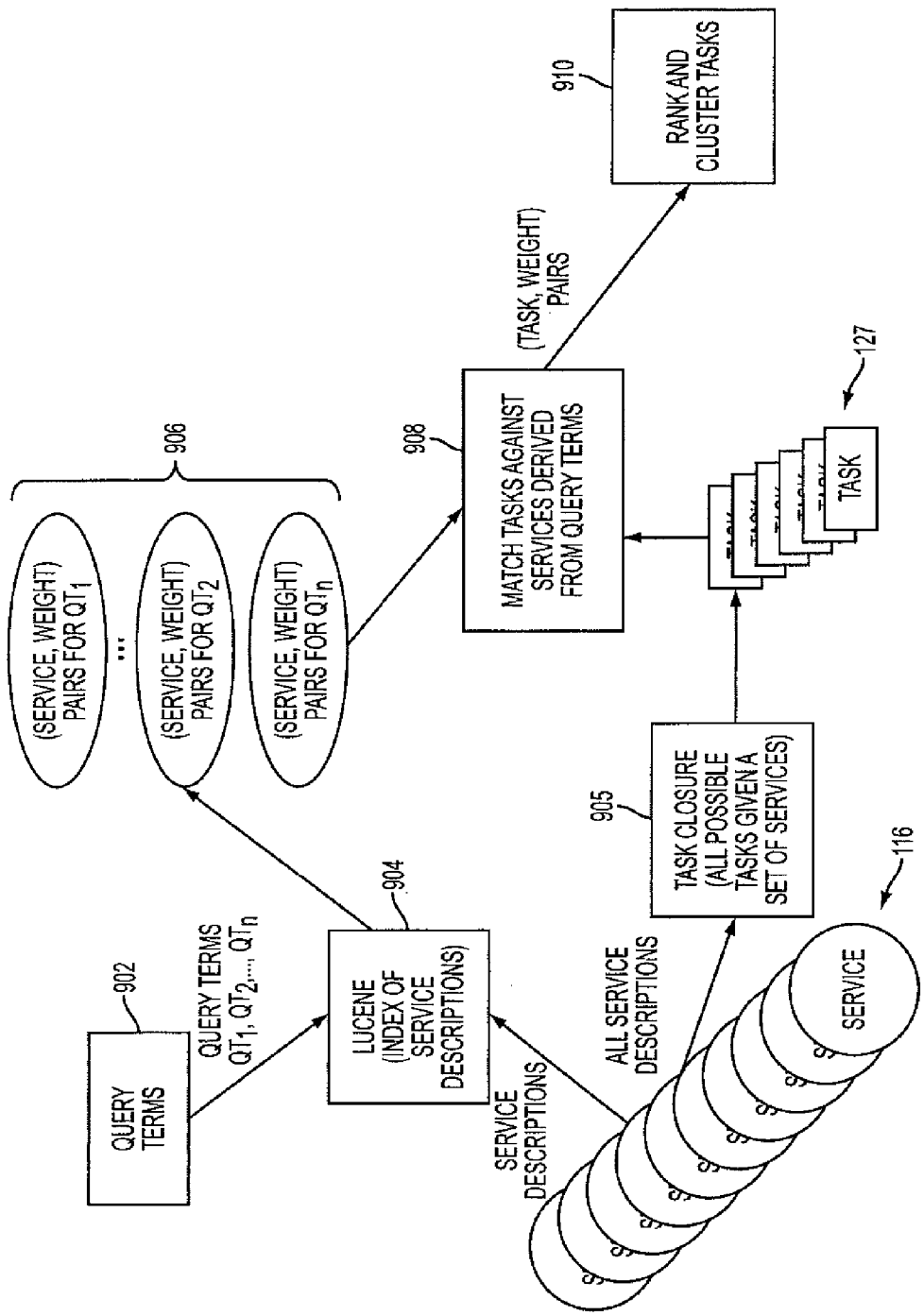
FIG. 9 is a flow chart of searching for a service and/or a task based upon a user query, according to an embodiment.

Searching for Services and/or Tasks:

FIG. 9 is a flow chart of searching for a service and/or a task, according to an embodiment. The goal is to return a collection of task results in response to a user query (task search). The query can be based upon text or any other item, such as (without limitation) image, etc. The functionality relies on the systems ability to first match query terms against services 112 (tasks 126 are workflows of services 112, thus they are comprised of services 112). As discussed, each service function 115 is associated with at least one SSD 116 as a meta-data description associated with the service function 115. The associated service function 115 and SSD 116 is deemed a service 112. A service 112 is known via the SSD 116 as soon as the SSD 116 is discovered. How query terms are matched against services 112 is discussed next.

According to an aspect of the embodiments, the service/task search system can use a text indexing system. For example, the embodiments can use LUCENE information retrieval Application Programming Interface (API). At operation 902, a query term(s) $QT_1, \ldots QT_n$ is input, and, at operation 904, LUCENE can be used to determine whether the query term(s) appears in a document (out of a collection of documents, also known as a corpus) and also provide a tf-idf weight for how well this term matches with a specific document using a (Service, Weight) pair 906 output. The tf-idf weight (term frequency-inverse document frequency) is a weight often used in information retrieval and text mining. This weight is a statistical measure used to evaluate how important a term is to a document in a collection or corpus. The importance increases proportionally to the number of times a word appears in the document, but is offset by the frequency of the word in the overall corpus. Variations of the tf-idf weighting scheme are often used by search engines to score and rank a document's relevance given a user query.

In FIG. 9, the corpus is the collection of all service descriptions 116 and each "document" in the corpus is a single service description 116. Specifically, the entire service descriptions 116 do not have to be indexed, but only attributes or fields that are a concise representation of the service function 115. For example, five fields in the SSD 116 that can be indexed and stored in the embodiment search system are "service label," "service name," "service description," "input" and "output." When searching for a term, LUCENE searches over these five fields of each SSD 116, sums up scores from all fields and normalizes to a number between 0 and 1.

It is possible to give different weights to the score from each field of the service descriptions 116. The reason for this is to emphasize and de-emphasize the importance of the query terms matching certain fields. This is part of the tuning of the system. In a multi-user environment, the system might allow users to provide descriptive labels to services; such labels generate additional metadata associated with each service description. In order to emphasize the user-given labels, the system can set a higher boost value, for example 10, for label fields; that is, the system would multiply the score from label field by 10 to boost its importance. Similarly, since the value of the "service name" and "service description" fields are given by authors of the SSDs 116, they can be concise representations of the service function 115 and give them, for example, a boost value, perhaps lower than the boost value of a label, for example 7. The boost values can be arbitrary or based upon any application driven criteria. At last the service score will be normalized to a number between 0 and 1 using equation (1).

$$\text{service score} = \text{norm}(\text{label score} \ast \text{boost value1} + \text{name score} \ast \text{boost value2} + \text{description score} \ast \text{boost value3} + \text{I/O scores} \ast \text{boost value4}) \quad \text{Equation (1)}$$

The embodiments are not limited to Equation (1), and other formulas can be used to determine the service 112 score. This way, given a single query term we can use Lucene to perform a search over the collection of service descriptions and identify which services the term matched and how well it matched so (score).

Lets suppose that the user enters a query in the search task box 530. Suppose there are 3 search terms QT1, QT2 and QT3 in this query (the query may contain any finite number of query terms, but three query terms for this descriptive example). Each term QTi is matched against the list of all services and returns a subset of all services that are considered to match the query term QT1 along with a weight that indicates how well the service matches the query term. So, the output of the process 904 is a set of (Service, Weight) pairs for each query term input at operation 902, which can be referred to as S1.

Meanwhile, at operation 905, the list of all services is used to compute the set of all possible tasks 126, referred to as a task closure 127. This task closure 127 can be updated every time a new service is discovered or is not available anymore. At operation 908, the goal is to best match the user's query terms against the set of all possible tasks 127 and return to the user a subset of all tasks that is deemed to best match the user's query terms (matching tasks against services derived from query terms in operation 904). At operation 910, the result set, i.e., a list of tasks, will be presented as a list with tasks that are deemed to better match the user's query appearing at the top (ranking). Moreover, the result might be presented as groupings of tasks (clusters), such that the tasks in each group are deemed to be similar, instead of a simple list. Operation 910 can be referred to as ranking and clustering.

In operation 908, a task 126 from the task closure is considered to match against the query terms, if the task is comprised of services 112 that also appear in each set of (service, weight) pairs $S_1$, $S_2$ and $S_3$, ... $S_i$ output for each query term at operation 904. It is not necessary that every service in the task appears in one or more of $S_1$, $S_2$ and $S_3$. It is sufficient that there is at least one service 112 from each of $S_1$, $S_2$ and $S_3$ that also appears in the task 126. If so, the task 126 is added to the search results. Alternative embodiments may be provided for specifying how many services in the task appear in the sets of (service, weight) pairs output for each query term. Operation 908 can also compute a weight that indicates how well the particular task 126 matched the query and output a (task, weight) pair. The weight of the task is computed as the sum of the weights of the services 112 in the task 126 that also appeared in each of S1, S2 and S3. Operation 908 is repeated for each of the tasks 126 in the task closure. The tasks 126 that matched against the query terms and their respective weights are returned as the task result. Subsequently, at operation 910, the tasks 126 are ranked according to their weights.

If task search is deployed in a multi-user environment, where users have to login in order to do task searches it is possible to keep track of a user's search but also executions of tasks. Then, the system can take into account a specific user's execution history when ranking task search results. When a task is executed by the user, an execution entry is logged for that particular task. Therefore, the system can determine how many times a particular task has been executed by the user that posed the original query. At operation 910, after the system ranks all the tasks in the task search results, the system can include the task execution weight and re-rank them. The inclusion of the task execution weight can be done in a variety of ways. One way is to add it to the previously computed weight of the task 126.

According to an aspect of the embodiments, since some of the tasks 126 can be seemed similar to one another, at operation 910, it is possible to cluster the result tasks in clusters of similar tasks. Generally, task search results are clustered into groups, if the number of results is larger than a certain threshold (say more than 10 task results). Each cluster has one lead task, and all the tasks which are different from the head task by only 1 service 112 are clustered into the group headed by the head task.

In FIG. 9, at operation 910, the task clustering is the last step of the task search, after all the tasks are ranked. The clustering works like the following:

Input: a list of ranked tasks.
Output: a list of head tasks.
For each task in the ranked tasks,
If the task is different by more than 1 service from all tasks in the output list,
then put the task into the output list,
else do nothing with the task.

According to an aspect of the service/task search embodiments, a user can find or identify processes (tasks) 126 simply by posing a text query (search). The system search against the space of all possible processes 127 and returns the results to the user ranked and grouped so that the likelihood of the process 126 that the user might be looking for being presented towards the top of the returned results is increased. For example, the user can define a task 126 through a query search of the task space and/or through the SNAPFIT composer 118*b*.

The space of all possible processes 127 is dynamically recomputed based on the services that are known to the system (i.e., discovered). The ranking of the results may be updated dynamically since in a multi-user environment, the ranking might take into account the usage of tasks by the user who conducts the search (or by other users). Usage refers to tasks that the user may have selected for execution while using the system.

Figure 10:
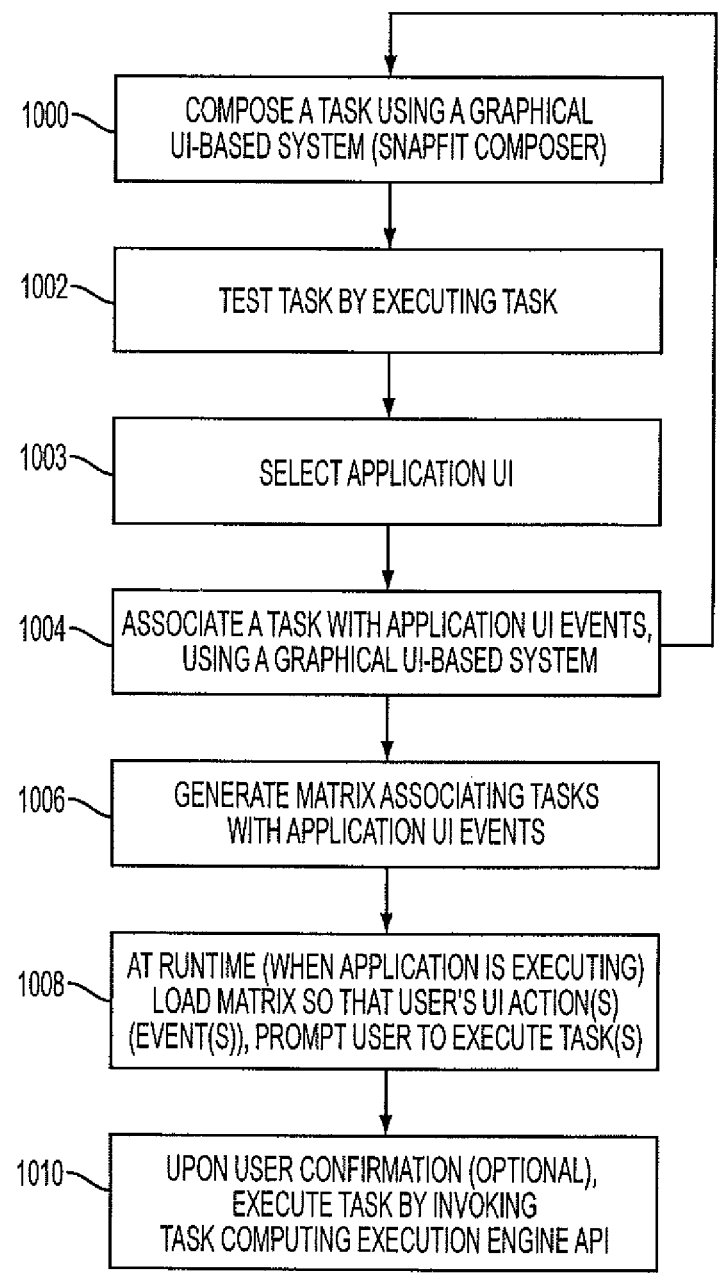
FIG. 10 is a flow chart of building an application, according to an embodiment.

FIG. 10 is a flow chart of building an application, according to an embodiment. In FIG. 10, at operation 1000, a graphical user interface is generated to support a user compose a task 126 based upon one or more services 112 according to a process-in-creation 532 operation. According to an aspect of the embodiments, the generated GUI is SNAPFIT composer 118*b*. At operation 1002, the user can test a task by executing a task. According to another aspect of the embodiments, the user may use existing or discovered services 112 and/or tasks 126 as services 112, thus operations 1000 and 1002 may be optional.

At operation 1003, the user selects an application User Interface (UI). At operation 1004, the user selects an application user interface event(s) to which the user can associate a task 126. The embodiments differ from typical association of user interface events on user interface objects as follows. Typically, a what a user sees in a user interface, whether it is graphical or textual, is collections of items, that as previously explained can be thought of as corresponding to a query against the objects that the application manages/handles. This "query" is code written in the implementation language of the user interface. The results of the query are typically processed (parsed) and after further manipulation (formatting) are displayed in the user interface.

For example, consider the simple case of a page (as in a webpage), or a canvas, or a panel (of a frame in the case of a webpage) that displays the books checked out by a specific (say, current) user. The query in this case is "books checked out by Person X". When the query is processed, the query is executed, perhaps, against a database that has stored this information. The query would specify exactly what the returned result of the executed query should be for example, the title, author, ISBN of each book checked out book. Or, it could just specify the title and author of the book, or, the title, ISBN, publication data and a summary. However, the query results are not really the conceptual objects "books", i.e., a collection of the books with all the information on them available in the database, but whatever the programmer decides to display in the user interface. Even if the query returns all the information available in each book, when the programmer's code parses the information in order to decide what information to display at the user interface, only some programmer specified subset of this information will be displayed to the user, such that UI action upon UI events are statically predetermined in advance by the programmer, and any changes thereto requires programming.

The programming environment of the user interface also offers the programmer the capability to define the query to be executed at the event of a user interface event taking place. For example, to specify what is to be done if the user clicks on the author of a book (in the listing of results mentioned above), or, if the user drags and drops a visual representation of the book (say an image of its cover) to an image of the user. Typically, the programmer will write code that will associate the specific user interface action with a query or action, so that whenever the user performs that action, the query or action is executed.

The typical approach has the limitation that only a programmer can implement the association between user interface events and actions to be executed. Also, for each UI action and for each object represented in the user interface, the programmer will have to write the corresponding code.

Figure 11A:
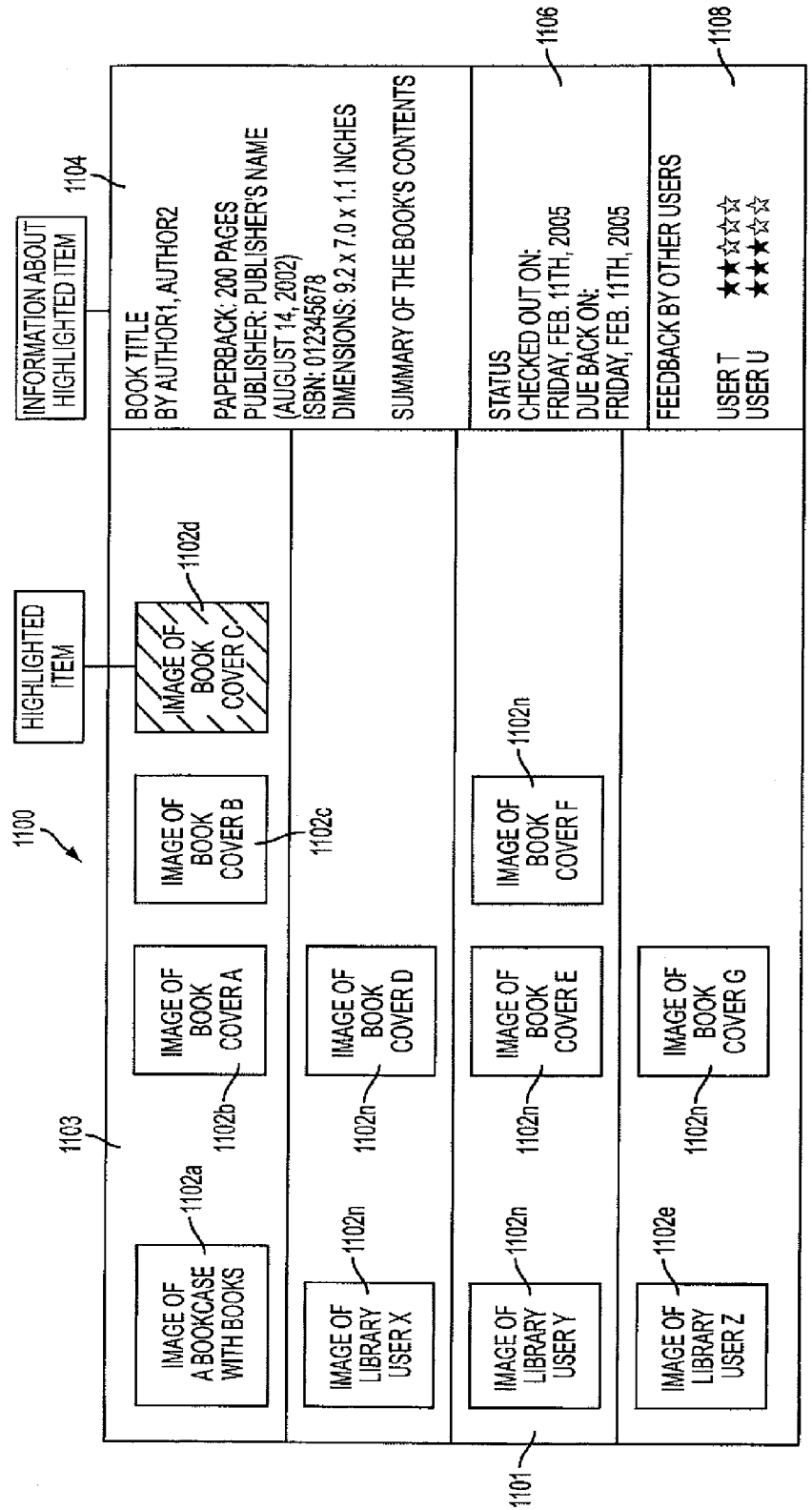
FIGS. 11A and 11B are diagrams of user interface transitions for an application, according to an embodiment.
Figure 11B:
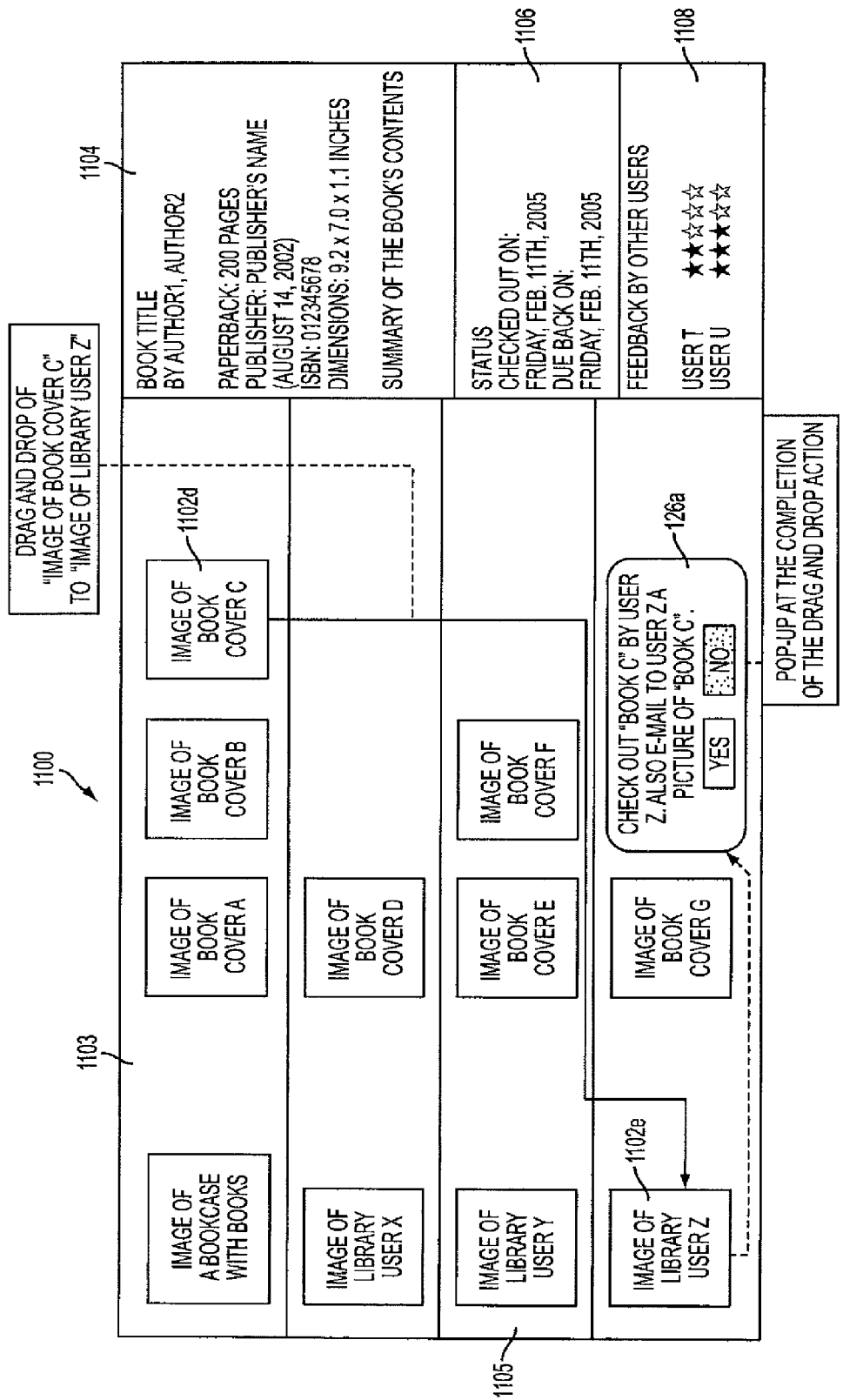

FIGS. 11A and 11B are diagrams of user interface transitions for an application, according to an embodiment. According to an aspect of the embodiments, for example, at operation 1004, the user selects a library manager application user interface 1100 for associating tasks 126 to user interface events on objects 1102a-n of the library manager application UI. In FIG. 11A, the canvas (screen) 1100 as the UI of a library manager application is partitioned in 5 panels or windows. The bottom left panel 1105 displays a list of UI objects 1102 of "Person" and "books checked out by that person" rows. A "person" is a user of the library and "book" refers to a book that is available in the library. "Persons" and "Books" are presented in graphical form, as icons, specifically a picture for each "Person" and of the front cover for each "Book."

The top left panel 1103 has a single row of UI objects 1102 of "Library" and "Books not checked out from Library yet" and is intended to show all the books available in the library that have not been checked out from the library yet. A book that has been checked out is going to be shown next to the "person" that checked it out.

The top right panel 1104 displays information about a book whenever a "Book" is "selected", e.g., the user clicks on the icon of the "Book" on any of the two left panels.

The middle right panel 1106 presents information about the status of the book in this library system.

The bottom right panel 1108 displays feedback about the book from library users.

A user interface can be thought of as a canvas, possibly partitioned in logically distinct areas that we will call panels (or frames). Each panel presents one or more collections of objects 1102 of the same kind and each collection can be thought of as a result of a query. Often, the objects 1102 in each panel are related.

A user interface might have multiple canvases, each canvas having its own layout, i.e., number and arrangement of panels, and different types of objects in each panel. This is different than the same canvas changing over time, i.e., displaying different objects, but of the same type, over time. As long as the queries that specify the objects to be displayed on each panel do not change, the canvas could be considered to be the same.

In FIG. 11A, a user performs actions on the objects of a canvas. These actions are the typical actions supported by a graphical user interface, such as clicking on (selecting) an object, double-clicking, dragging and dropping an object to another object, right-clicking on an object (pressing the right button of a 2-button or 3-button mouse, which typically results a list of items been displayed). Each of these actions results to a simple or composite process 126 associated with this action to be executed. For example, in FIG. 11B, dragging a book UI object 1102d from the "Books not checked out from Library yet" panel into the UI object (icon) of a person 1102e, might result to the execution of a composed process 126 "Check out the dragged book to the dropped person."

In FIG. 10, at operation 1006, a matrix is generated associating tasks with application UI events as the output of operation 1004. For example, at operation 1006, a matrix is generated when the UI objects 1102d and 1102e are associated with the process (task) 126 "Check out the dragged book to the dropped person." According to an aspect of the embodiments, at operation 1008, at runtime (when application is executing) the matrix is loaded so that the user's UI action(s) (events(s)) prompt the user to execute task(s). For example, in FIG. 11B, when the image of book cover C 1102d is dragged and dropped into image of library user Z 1102e), the user is prompted to executed the task "Check out 'book C' by user Z. Also email to user Z a picture of 'book C'" 126a. At operation 1010, upon user confirmation (optional), the task 126a is executed by invoking the TASK COMPUTING execution engine 108 by the API 106.

Figure 12:
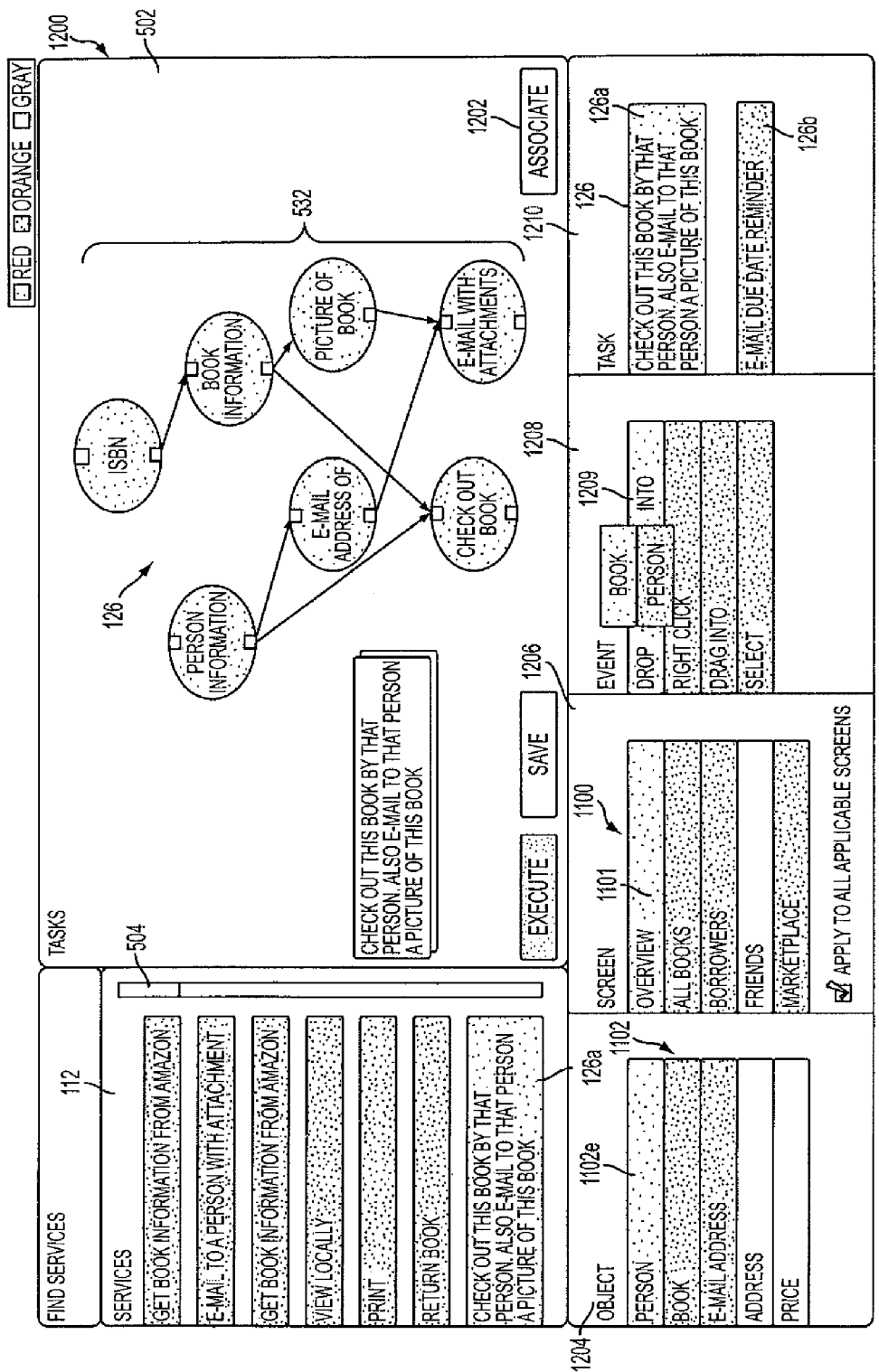
FIG. 12 is a diagram of a user interface for a tool for associating defined processes with a user interface for an application, according to an embodiment.

FIG. 12 is a diagram of a user interface for a tool for associating defined processes with a user interface for an application, according to an embodiment. For example, FIG. 12 is a user interface 1200 for SNAPFIT composer 118b including a function to associate an application user interface event to a task. According to an aspect of the embodiments, using SNAPFIT composer 118b, a non-programmer can associate the defined processes 126 with a user interface of an application, for example, a library management application, without the non-programmer having to write code for this purpose, as opposed to the conventional way of a programmer writing code. For example, the application can display the status of books in a physical library and to add books to the library, to add and remove users to the library (so that they can borrow books), to allow users to check in and out books, to get additional information about books, to offer feedback/comments/rating on the books, etc., all of which are composed processes 126 that are associated with the user interface events (actions) of this library management application.

How, at operation 1004, a non-programmer can associate the defined processes 126 with the actions on a selected application user interface (e.g., UI 1100) at operation 1004, using a graphical tool 118*b*, is discussed next. The output of this graphical tool 118*b* is a specification of which processes (tasks) 126 are associated with which event (UI action) on each object type of each panel of the selected application UI 1100. According to an aspect of the embodiments, the output of the SNAPFIT composer 118*b* is the operation 1006 matrix, simply referred to as a user interface-events-to-task matrix (UI-Task matrix). The UI-Task matrix, when applied to the panels 1100 will result to the specified defined tasks 126 be executed as prescribed; e.g., dragging a book from the "Books not checked out from Library yet" panel into the icon of a person, will result to the execution of the process "Check out the dragged book to the dropped person" 126.

The concept of defining canvases including panels thereof of an application UI, for example the UI 1100, is known. As mentioned, what each panel displays can be expressed and understood in terms of queries (which can be implemented for example as database queries). The query is the declarative specification of the panel 1100 and the output of the query is the objects (e.g., 1102, 1104, 1106, 1108, etc.) displayed in the panel 1100. Selected attributes of the output objects of the query can be displayed in the panel.

For example, in FIGS. 11A-11B, each panel corresponds to a single query or multiple queries also. For example, in the bottom left panel 1105 of the UI 1100, which displays a list of UI objects 1102 of "Person" and "books checked out by that person" rows, where a "person" is a user of the library and "book" refers to a book that is available in the library, the query is "Books checked out for each library user," which returns pairs of (Person, List of books) and in the UI the respective selected attributes of "Person" and each "Book" in list of Books, are an image (or a URL to that image) for each Person and an image (or a URL to that image) of the cover of the Book for each Book. As a result, "Persons" and "Books" are presented in graphical form, as icons, specifically as a picture for each "Person" and the front cover for each "Book." According to an aspect of the embodiments, the panels and associated queries have been specified by the designer of the application's user interface, prior to operation 1003.

The topology of the graphical user interface for associating processes (tasks) 126 with the application user interface event is discussed next. The "association" functionality can be invoked in the composition panel 502 after the user selects a service/task 112 in the service area 504 or has completed (and/or tested) the creation of a process/task 532 in the composition panel 502, e.g., by pressing the "associate" button 1202 in the SNAPFIT composer UI 1200. Typically, but not exclusively, a task 126 is associated with a UI object 1102 of a specific type. According to an aspect of the embodiments, for each UI object 1102 an ontology-based metadata is defined/generated.

Figure 13:
FIG. 13 is a semantic instance of a user interface object, according to an embodiment.

FIG. 13 is a semantic instance of a user interface object of an application, according to an embodiment. In particular, FIG. 13 is a semantic instance 1300 of a book, which is a UI object in the library manager application, according to an embodiment. In FIG. 13, the semantic instance is expressed as RDF. First, each object that appears in the user interface must be associated with the metadata instance, e.g., semantic instance, that it represents. For example, the image of a book's cover, represents a specific book object; the complete semantic description is associated with the manifestation of the book object in the UI (e.g., image) through, perhaps, a link that points to the complete semantic description of this book. As a result, if the task for "person X check out book Y" has been implemented, whenever this task is invoked by dragging the icon representing book Y in the user interface is dropped to the icon representing book Y in the user interface, X and Y will be instantiated to the complete semantic instances for person X and book Y respectively.

The sequence of UI event to task association entails associating a process 126 with a UI object type 1102, at a specific canvas 1100, on the invocation of a specific UI event 1210. According to an aspect of the embodiments, the association is based upon defined identifiers or handles for the UI object type 1102, canvas 1100, and UI event 1210. The order object type, canvas (or panel), event, task is one of the possible sequences for creating the association.

FIG. 12 is used to describe in detail the sequence of associating the defined processes 126 with a user interface 1100 for the library management application, but the embodiments are not limited to FIG. 12 and variations on this sequence may be provided. In particular, FIG. 12 is a user interface of a tool 1200 for specifying processes 126 in an application and associating these processes 126 with events (e.g., mouse, keyboard, etc.) by the end user at the user interface 1100 of the application. For example, in FIG. 12, the user can select the task "Check out this book by that person. Also email to that person a picture of this book" 126 from the services area 504. In FIG. 12, the selections are represented by a red color. Since an association focuses on a specific task, only a subset of all object types (on all canvases) can be typically associated with this task. So after a task is selected, first, a panel 1204 is displayed which shows all the objects 1102 on all canvases/panels 1100 and all events 1210, but with the object types that are not relevant to the specific task 126 being grayed out as non-selectable or non-active. In FIG. 12, the user interface 1200 items on which an operation can be performed are represented by an orange color. According to an aspect of an embodiment, the UI objects 1204, the UI display screens (canvases) 1206 and the UI events 1208 for the subject application can be determined according to queries, output of queries, or both on the object(s) of the UI of the subject application. The "active" objects 1102, each having an ontology-based metadata, and mentioned by their user-understood name (typically their name in the ontology) are listed and the user selects one of them, e.g., in FIG. 12, the user selects the object type "Person" 1102*e*. It is possible to identify which UI objects appear in which panel by examining the queries, results (outputs) of queries, or both that specify the objects for each panel for each canvas, since the queries themselves apply on the objects known to the application.

Then, the user interface 1200 displays a new panel 1206 with the canvases 1100 in which the selected object 1102, in this case "Person" 1102*e* generally appears. As before, it is possible that all canvases are displayed but the non-active canvases the grayed-out. An option is made available to the user to apply subsequent choices to all relevant canvases, say, through a checkbox, or to a single selected canvas. For example, in FIG. 12, the user can select the "overview" canvas 1101 in the UI 1100.

Next, the user interface 1200 display a list of possible events 1208 for the selected object 1102*e* on the "overview" canvas 1101. The user needs to determine the application user interface event that will cause the invocation (execution) of the selected task 126. The possible list 1208 includes "drop the selected object into another object," "right click (select)," "drag selected object into another object," and "Select" events. For example, the user can select the "Drop the selected object into another object" event 1209, which accepts as input either a "book" or a "person" or both. In FIG. 12, the user selects "book" for the event 1209, at which time tasks 126 (126*a* and 126*b*) that can be associated with this event 1209 are presented in the task panel 1210. If task 126*a* has been selected in the services panel 504, then it will automatically be selected in the task panel 1210, otherwise the user can select the task 126*a*. According to an aspect of an embodiment, upon selection of one of the UI events, the user is presented selectable tasks 126 for associating with the selected UI event, based upon inputs and/or outputs of tasks and inputs and/or outputs of the selected UI event. For example, in FIG. 12, the task 126*a* can be associated with the UI event 1209, because this task 126*a* can accept inputs of "book" and "person" from the UI event 1209. The lists of tasks 126 for association in the task panel 1210 can be provided through a query search of the task space and/or through a process-in-creation 532 in the composition panel 532. Events that have already been associated with a specific task will be grayed out, if only one task can be associated with the event. This is not the case with the right click event which typically presents a list of tasks, instead of just one. In general, it is possible to associate more than one task with any event, in which case whenever the event takes place a popup menu will be presented in the application interface for the user of the application to select and specify.

The output of SNAPFIT composer 118*b* is a multi-dimensional matrix, along the dimensions of canvas (or canvas/panel), object, event, task. This matrix is a representation of which actions should be made available to the user of the application (in this example, of the "library management system"), for every UI action (click/select, right-click, drag and drop, etc.), for each visual representation of the application's objects ("book", "person", etc.) on each canvas and or panel of the User Interface. For example, in FIG. 12 for the selected task 126*a*, the library management system's operations can be as follows: Whenever there is a graphical or textual object in the UI that corresponds to a person, and whenever such an object appears in the UI's canvas (panel) referred to as "Overview," make available the UI action "drop an object of type Book into the person," and when the user executes this UI action, prompt the user for the selected task "Check out this book by that person; Also e-mail to that person a picture of this book" 126*a* for this UI action, which can be executed upon the end-user's confirmation (operation 1010).

Next is described how at operation 1008 an application at runtime can use the multi-dimensional matrix that is output by operation 1006 (while the application is running and users interact with its User Interface), to perform operation 1010 during the runtime of the application According to an aspect of an embodiment, an Application Programming Interface (API) is provided for searching the matrix output at operation 1006 (matrix API) and for executing the associated task 126. The matrix API can be for the specific environment that the user interface of the target application (e.g., library management system's UI) is implemented. The matrix API is used for searching the matrix so that each user interface action (click, drag-drop, etc.) can be "resolved" against the multi-dimensional matrix. For that purpose, the API at each occurrence of a UI event, searches the matrix for the appropriate entry and executes the associated task 126.

Figure 14A:
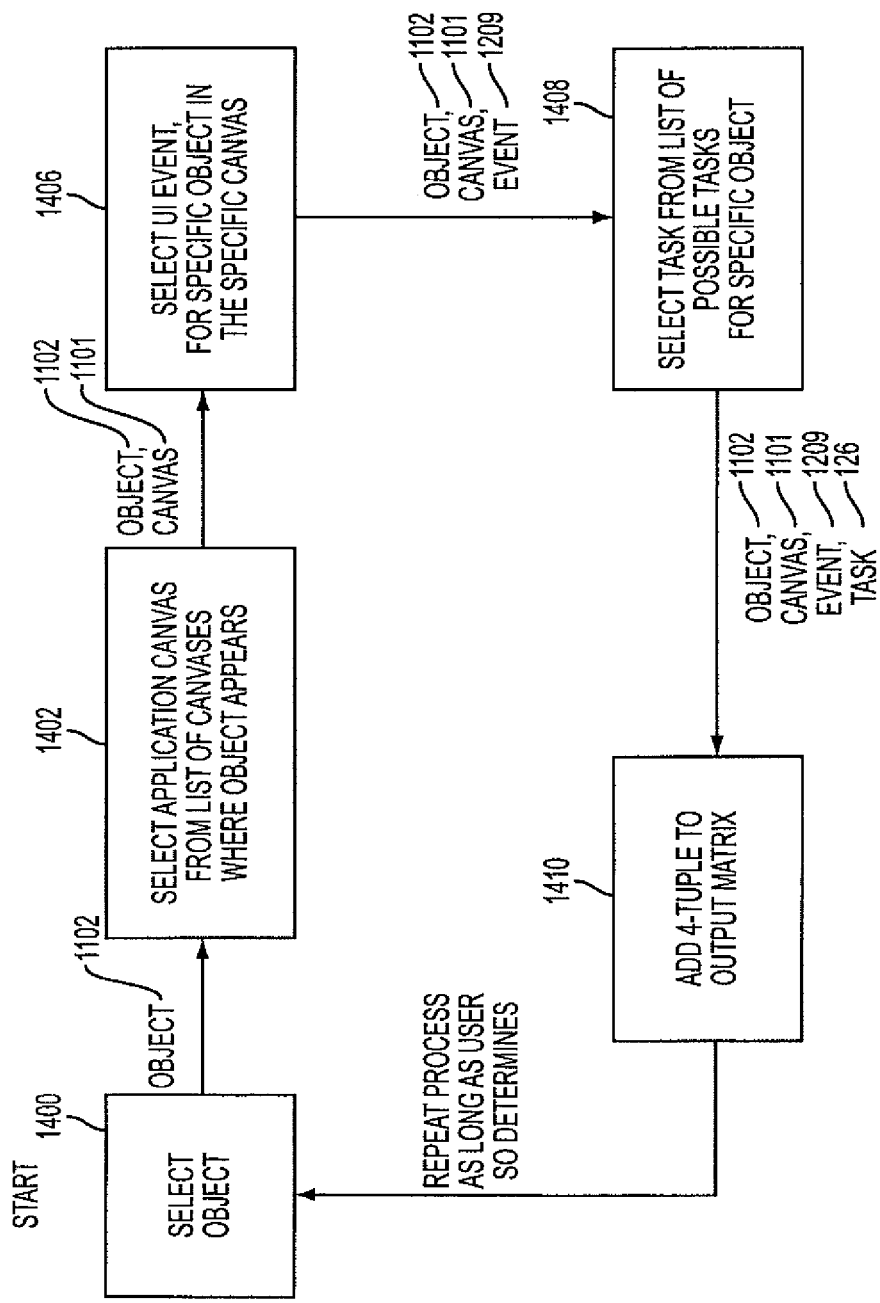
FIGS. 14A and 14B are flowcharts of associating a task with a user interface of an application, according to an embodiment.
Figure 14B:
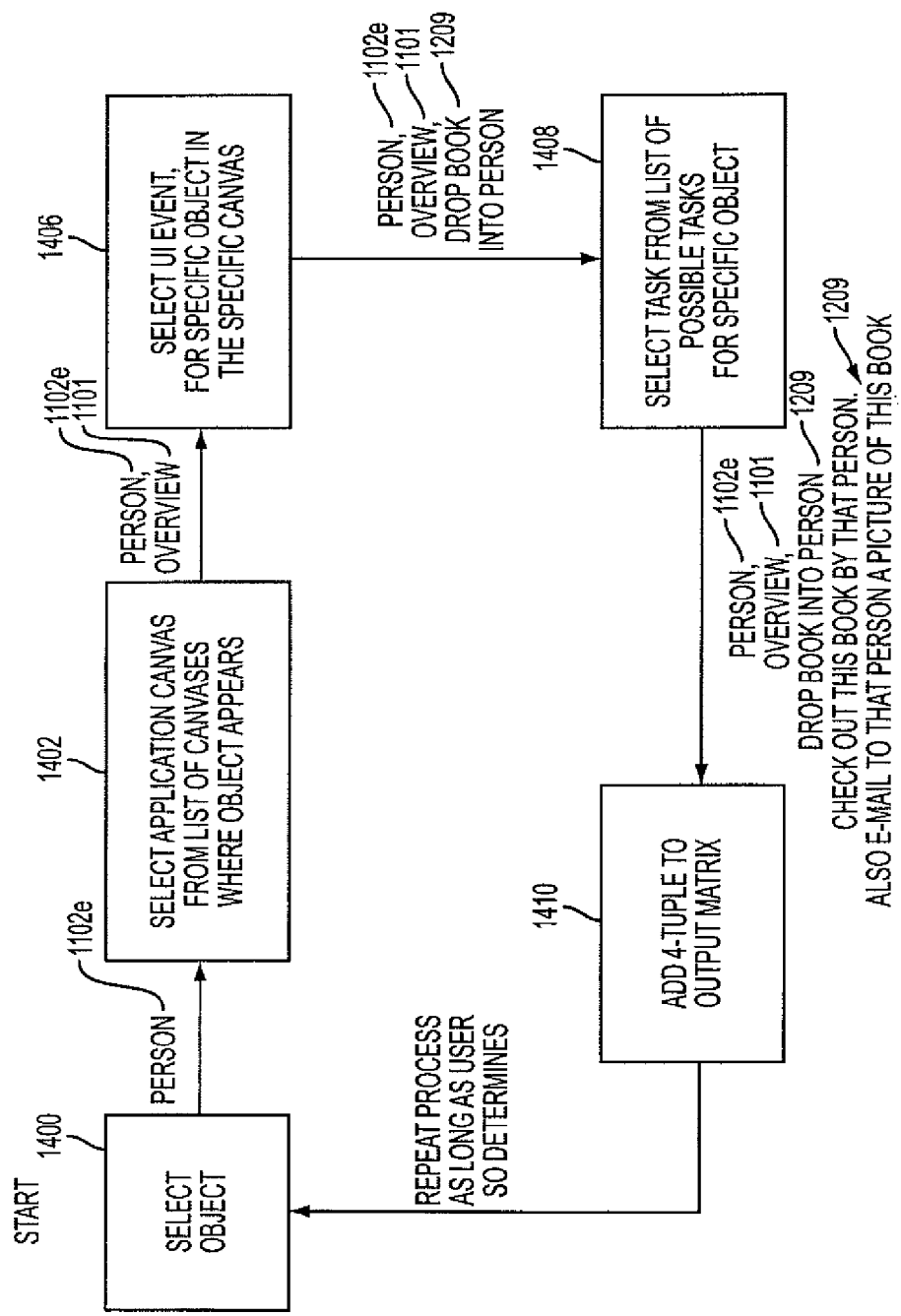

FIGS. 14A and 14B are flow charts of associating a task with a user interface of an application, according to an embodiment, i.e., of generating the multi-dimensional matrix that is the output of operation 1006 using the GUI 1200 of the SNAPFIT composer 118*b*. At operation 1400 a UI object is selected. In FIG. 14B, the selected object can be "person" 1102*e*. At operation 1402, an application canvas is selected from list of canvases where the selected object appears. In FIG. 14B, the canvas "overview" 1101 is selected. At operation 1406, a UI event is selected for the selected object in the selected canvas. In FIG. 14B, the "Drop Book Into Person" event 1209 is selected for the "person" object 1102*e* in the "overview" canvas 1101. At operation 1408, a task is selected from a list of possible tasks for the selected object. For example, in FIG. 14B, the user can select the "Check out this book by that person, and also email to that person a picture of this book" task 126*a*. At operation 1410, the 4-tuple (UI object, UI canvas, UI event, task) are output as a matrix of identifiers representing the members of the tuple.

In FIGS. 14A-B, every iteration generates a 4-tuple of the type: (Object, Canvas, Event, Task). One specific example of such a tuple is the following: (Person, Overview, Drop Book into Person, Check out this book by that person. Also e-mail to that person a picture of this book). If the user (designer) run the operations 3 times to create 3 such 4-tuples, the output matrix might be as follows:

(1) (Person, Overview, Drop Book into Person, Check out this book by that person. Also e-mail to that person a picture of this book).

(2) (Person, Overview, Right click, Send an e-mail to this person with the books checked out by the person).

(3) (Person, Overview, Right Click, Display the reviews of this person's closest friends).

According to an aspect of the embodiments, the tuple members can be represented by known techniques. For example, task might be represented by the task name in form of a text string, or the matrix might have a more compact representation, as tasks might be referenced by their task id's instead their textual description, and so on.

An apparatus provides a plurality of computing sources of functionality, each computing source of functionality presenting a service and existing in a computing environment of the apparatus, a computing environment in network communication with the apparatus, or any combinations thereof, the apparatus comprising a controller associating a semantic service description (SSD) with the service, wherein the SSD comprises a semantic description of the service, including a semantic description of a parameter of the service, according to a computer interpretable language, and, as a service grounding, a mapping between the computer interpretable language expressing the SSD and an interface, including an interface parameter, of the service; dynamically discovering one or more SSDs as known services through a plurality of discovery mechanisms discovering the SSDs; supporting dynamic composition of a task based upon a user selection of a plurality of the known services; and supporting dynamic association of the task with a user interface (UI) of an application, based upon associating the task with the user selection of a UI object, a UI display screen, and a UI event for the application.

Further, the dynamic association of the task with the application user interface comprises generating a matrix of the UI object, the UI display screen, the UI event and the task. Further, the matrix comprises identifiers corresponding to the UI object, the UI display screen, the UI event and the task. Further, the supporting of the dynamic association of the task with the application user interface comprises associating metadata with each UI object, presenting to the user selectable UI objects based upon the metadata, upon selection of one of the UI objects, presenting to the user selectable UI display screens in which the selected UI object appears, upon selection of one of the UI display screens presenting to the user selectable UI events for the selected UI object in the selected UI display screen, and upon selection of one of the UI events, presenting to the user selectable tasks for associating with the selected UI event, based upon inputs and/or outputs of tasks and inputs and/or outputs of the selected UI event.

Figure 1:
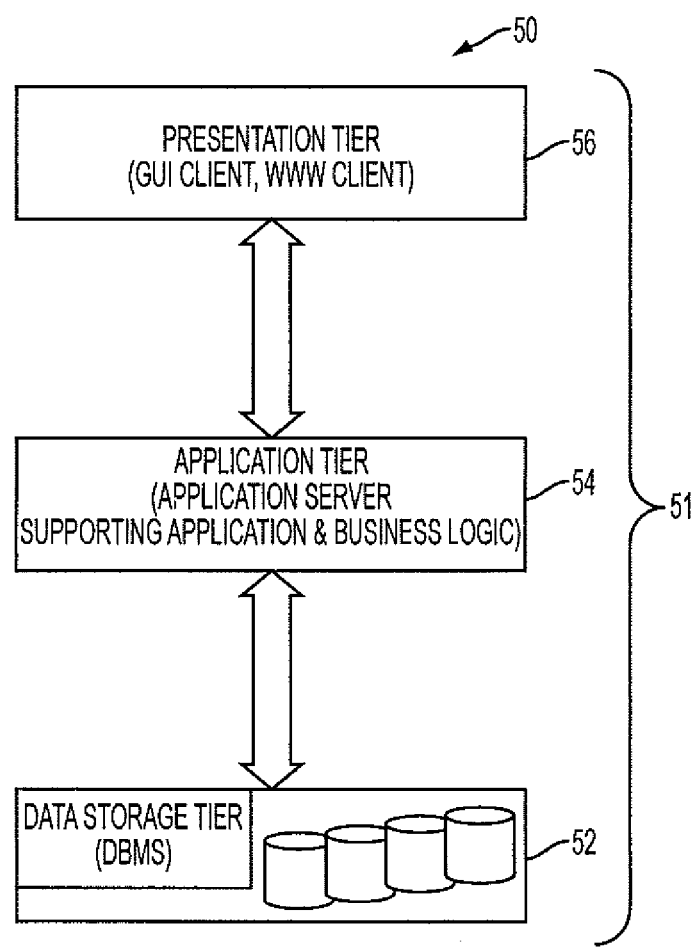
FIG. 1 is a diagram of functional tiers or layers in a computer system application.

The embodiments can be software and/or computing hardware. A method, an apparatus, and computer readable media according to the embodiments is provided. An apparatus can be any computing device, for example (without limitation), a personal computer. In FIG. 1, the computer 51 (apparatus/machine) includes display to display a user interface and a controller (e.g., a central processing unit) executes instructions (e.g., a computer program or software) that control the apparatus to perform operations. Typically, a memory stores the instructions for execution by the controller. According to an aspect of an embodiment, the apparatus reads any computer readable media, such as (without limitation) a hard drive, or wire/wireless network transmission. The display, the CPU, the memory and the computer readable media are in communication by a data bus. The described examples of embodiments can be software (as stored or encoded on any known computer readable media, such as, without limitation, compact disk, Digital Versatile Disc (DVD), memory, carrier wave or electro-magnetic signals, etc.) and/or on any computing hardware.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An apparatus providing a plurality of computing sources of functionality, each computing source of functionality presenting a service and existing in a computing environment of the apparatus, in a computing environment in network communication with the apparatus, or in any combinations thereof, the apparatus comprising:
   a computer processor; and
   a non-transitory computer readable storage medium which stores instructions, which when executed by the computer processor, cause the computer processor to execute:
   dynamically discover one or more semantic service descriptions (SSDs) as known services through a plurality of discovery mechanisms discovering the SSDs, an SSD including a semantic description of the service and a semantic description of a parameter of the service, according to a computer interpretable language, and as a service grounding, mapping information between the computer interpretable language expressing the SSD and an interface, including an interface parameter, of the service;
   support dynamic composition of a task composed of a plurality of the discovered known services based upon a task composer selection of a plurality of the discovered known services; and
   dynamically output a specification of association of user interface (UI) objects, user interface (UI) events and user interface (UI) display screens to a selected composed tasks responsive to selection of a UI object and association of the selected UI object with a selected UI event to a selected UI display screen from selectable lists of one or more UI objects, UI events and UI display screens and selection of a composed task from among composed task candidates identified based upon input/output of a composed task and input/output of the selected UI object associated with the UI event to the UI display screen, thereby the selected composed task is executable upon displaying of the selected UI display screen and upon action on the selected UI event associated with the selected UI object displayed in the displayed selected UI display screen,
   wherein a UI object corresponds to an SSD as a discovered known service included in the selected composed task,
   wherein the specification of association of the UI objects, the UI events and the UI display screens to the selected composed tasks comprises generating a matrix of the selected UI object, the selected UI display screen for the selected UI object, the selected UI event for the selected UI object and the selected composed task.

2. The apparatus according to claim 1, wherein the matrix comprises identifiers corresponding to the selected UI object, the selected UI display screen, the selected UI event and the selected composed task.

3. The apparatus according to claim 1, wherein the association of the selected UI object with the selected UI event to the selected UI display screen comprises:
   associating metadata with a UI object,
   presenting to the task composer selectable UI objects based upon the metadata,
   upon selection of one of the UI objects, presenting to the task composer the list of selectable UI display screens in which the selected UI object appears,
   upon selection of one of the UI display screens presenting to the task composer selectable UI events for the selected UI object in the selected UI display screen, and
   upon selection of one of the UI events, presenting to the task composer selectable tasks for associating with the selected UI event, based upon inputs and/or outputs of tasks and inputs and/or outputs of the selected UI event.

4. The apparatus according to claim 3, wherein the UI objects, the UI display screens and the UI events are determined according to queries, output of queries or both specifying the UI objects of the task.

5. The apparatus according to claim 4, wherein the metadata is based upon an ontology.

6. The apparatus according to claim 1, wherein the dynamic composition of the task comprises continuously updating services available for the task during the composition of the task and automatically linking a selected service to the task during the composition of the task, based upon the semantic description in each SSD associated with each service.

7. The apparatus according to claim 1, wherein the controller further searches for a task based upon a query against all possible tasks.

8. The apparatus according to claim 7, wherein the task is searched by:
   searching the known services for a set of matched services based upon the query,
   determining a set of all possible tasks based upon the known services,
   searching for the task in the set of all possible tasks based upon the set of matched services.

9. The apparatus according to claim 8, wherein the searching of the known services for the set of matched services comprises comparing the query with one or more attributes in the SSDs corresponding to the known services, the attributes including one or more of service label, service name, service description, input, or output, or any combinations thereof.

10. The apparatus according to claim 9, wherein each SSD attribute is given a weight, and the set of matched services is according to the SSD attribute weights.

11. The apparatus according to claim 8, wherein the searching for the task in the set of all possible tasks based upon the set of matched services comprises computing a weight for the task and ranking a plurality of searched tasks based upon respective task weights.

12. The apparatus according to claim 11, wherein the task weight is based upon execution history of the task.

13. The apparatus according to claim 7, wherein the controller searches for a plurality of tasks and the plurality of searched tasks are grouped by similarity of services among the tasks.

14. A method of associating a user interface action for a task, wherein the task is based upon a plurality of computing sources of functionality, each computing source of functionality presenting a service and existing in a computing environment, the method comprising:
   executing by a computer to:
   dynamically discover one or more semantic service descriptions (SSDs) as known services through a plurality of discovery mechanisms discovering the SSDs, an SSD including a semantic description of the service and a semantic description of a parameter of the service, according to a computer interpretable language;
   support dynamic composition of a task composed of a plurality of the discovered known services based upon a task composer selection of a plurality of the known services; and
   dynamically output a specification of association of user interface (UI) objects, user interface (UI) events and user interface (UI) display screens to selected composed tasks responsive to selection of a UI object and association of the selected UI object with a selected UI event to a selected UI display screen from selectable lists of one or more UI objects, UI events and UI display screens and selection of a composed task from among composed task candidates identified based upon input/output of a composed task and input/output of the selected UI object associated with the UI event to the UI display screen, thereby the selected composed task is executable upon displaying of the selected UI display screen and upon action on the selected UI event associated with the selected UI object displayed in the displayed selected UI display screen,
   wherein a UI object corresponds to an SSD as a discovered known service included in the selected composed task,
   wherein the specification of association of the UI objects, the UI events and the UI display screens to the selected composed tasks comprises generating a matrix of the selected UI object, the selected UI display screen for the selected UI object, the selected UI event for the selected UI object and the selected composed task.

* * * * *